(12) United States Patent
Yokoi

(10) Patent No.: US 8,361,603 B2
(45) Date of Patent: Jan. 29, 2013

(54) INK COMPOSITION, INK COMPOSITION FOR INKJET RECORDING, INKJET RECORDING METHOD, AND PRINTED ARTICLE OBTAINED BY INKJET RECORDING METHOD

(75) Inventor: Kazuhiro Yokoi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 208 days.

(21) Appl. No.: 12/723,712

(22) Filed: Mar. 15, 2010

(65) Prior Publication Data

US 2010/0247873 A1    Sep. 30, 2010

(30) Foreign Application Priority Data

Mar. 31, 2009    (JP) ................... 2009-087864

(51) Int. Cl.
*B05D 3/06* (2006.01)
*C08L 27/12* (2006.01)
*C08L 43/04* (2006.01)

(52) U.S. Cl. ............. 428/195.1; 524/544; 524/547; 524/558; 524/588; 427/500; 427/504; 427/510; 427/511; 427/514

(58) Field of Classification Search .......... 524/544, 524/560, 588, 547, 558; 523/160; 428/195.1; 427/500, 504, 510, 511, 514
See application file for complete search history.

(56) References Cited

U.S. PATENT DOCUMENTS

| | | | |
|---|---|---|---|
| 4,134,813 A | 1/1979 | Kuesters et al. | |
| 7,919,545 B2 * | 4/2011 | Shimohara et al. | 523/160 |
| 2005/0119362 A1 | 6/2005 | Ishikawa | |
| 2006/0189750 A1 | 8/2006 | Maier et al. | |
| 2007/0115325 A1 | 5/2007 | Tsubaki | |
| 2008/0050534 A1 | 2/2008 | Louwet et al. | |
| 2009/0087626 A1 * | 4/2009 | Hayata et al. | 428/195.1 |
| 2009/0117286 A1 | 5/2009 | Ishikawa | |
| 2009/0202795 A1 * | 8/2009 | Hayata et al. | 428/195.1 |
| 2010/0075061 A1 | 3/2010 | Yokoi | |

FOREIGN PATENT DOCUMENTS

| | | |
|---|---|---|
| EP | 0588534 A | 3/1994 |
| EP | 1837381 A | 9/2007 |
| EP | 1944174 A | 7/2008 |
| EP | 2088175 A | 8/2009 |
| EP | 2130881 A1 * | 12/2009 |
| JP | 63-235382 A | 9/1988 |
| JP | 1-253731 A | 10/1989 |
| JP | 3-216379 A | 9/1991 |
| JP | 5-214280 A | 8/1993 |
| JP | 6-021256 B | 3/1994 |
| JP | 6-062905 B | 8/1994 |
| JP | 6-308727 A | 11/1994 |
| JP | 7-126551 A | 5/1995 |
| JP | 2002-167537 A | 6/2002 |
| JP | 2006-182970 A | 7/2006 |
| JP | 2008-75062 A | 4/2008 |
| JP | 2008-138028 A | 6/2008 |
| WO | 99/18043 A | 4/1999 |
| WO | 03/010249 A | 2/2003 |
| WO | 2004/031308 A | 4/2004 |
| WO | 2006/006402 A | 1/2006 |
| WO | 2007/077751 A | 7/2007 |
| WO | 2008/022908 A | 2/2008 |

OTHER PUBLICATIONS

EIC structure search results (Oct. 4, 2012).*
Corresponding EPO Official communication.

* cited by examiner

*Primary Examiner* — Vu A Nguyen
(74) *Attorney, Agent, or Firm* — SOLARIS Intellectual Property Group, PLLC

(57) ABSTRACT

The present invention provides an ink composition containing: a polymer having a polyoxyalkylene group and a partial structure selected from the group consisting of a fluoroalkyl group, a siloxane skeleton and a long-chain alkyl group; a polymerizable compound; and a polymerization initiator.

7 Claims, No Drawings

INK COMPOSITION, INK COMPOSITION FOR INKJET RECORDING, INKJET RECORDING METHOD, AND PRINTED ARTICLE OBTAINED BY INKJET RECORDING METHOD

CROSS-REFERENCE TO RELATED APPLICATION

This application claims priority under 35 USC 119 from Japanese Patent Application No. 2009-087864 filed on Mar. 31, 2009, the disclosure of which is incorporated by reference herein.

BACKGROUND

1. Field of the Invention

The present invention relates to an ink composition, an ink composition suitable for inkjet recording, an inkjet recording method making use of the ink composition, and a printed article obtained by the inkjet recording method.

2. Related Art

Image recording methods of forming an image on a recording medium such as paper based on image data signals, involve electrophotographic systems, sublimation type or melt type heat transfer systems, inkjet systems and the like. For example, inkjet systems may be operated with inexpensive recording apparatuses, and perform image formation directly on a recording medium by ejecting an ink composition only on the image areas where necessary. Thus, the inkjet systems may utilize ink with high efficiency at low running costs. Furthermore, the inkjet systems make less noise, and are excellent as an image recording system.

According to the inkjet systems, printing is possible not only on ordinary paper but also on non-absorptive recording media such as a plastic sheet and a metal plate. However, enhancement of the speed and image quality upon printing is becoming an important goal, and the inkjet systems have a nature that the time required for drying and curing of liquid droplets after printing greatly affects the productivity of printed articles and the sharpness of printed images.

One of the inkjet systems is a recording system making use of an ink for inkjet recording that is curable upon irradiation with a radiation. According to this method, ink liquid droplets are cured when irradiated with a radiation immediately after ink ejection or after a predefined time period, and thereby the productivity of printing is enhanced, while sharp images may be formed.

When sensitivity enhancement is successfully achieved for the inks for inkjet recording that are curable by irradiation with a radiation such as ultraviolet radiation, high curability against radiation is imparted to the inks, and numerous advantages occur, such as an enhancement of the productivity of inkjet recording, a reduction in the electric power consumption, an increase in the lifespan of the radiation generator due to decreased load, and prevention of volatilization and generation of low molecular weight substances resulting from insufficient curing. Furthermore, the sensitivity enhancement is important, particularly in terms of enhancing the strength of the formed images.

Such inkjet systems that are curable by a radiation, for example, ultraviolet radiation, are attracting an increasing attraction in recent years, since the systems produce relative less foul odor and are capable of recording on a recording medium which lacks quick-dryability and ink absorbability. Thus, there has been suggested an ultraviolet-curable ink composition utilizing radical polymerization (see, for example, Japanese Patent Application Laid-Open (JP-A) Nos. 63-235382, 3-216379 and 5-214280, Japanese Patent Application Publication (JP-B) Nos. 6-21256 and 6-62905).

There is also known an ink composition having high curing sensitivity and capable of producing images with good image quality, which composition includes at least one hydrophobic polymer selected from the group consisting of a fluoro group-containing polymer, a long-chain alkyl group-containing polymer and an alicyclic group-containing polymer (see, for example, JP-A No. 2006-182970).

However, these ink compositions have problems such as the tackiness of formed images, the occurrence of the phenomenon of low molecular weight components exuding at the image surface (so-called leaching), and insufficient blocking resistance. Furthermore, if a large amount of polyfunctional monomers are used to suppress leaching, the viscosity of the ink composition increases so that images lack smoothness and there may be concerns about the jettability of the ink composition. There has also been a problem of the cured images (cured films) becoming brittle.

It has been suggested to use various photopolymerization initiators in ink compositions in order to increase the sensitivity to radiation and to enhance the blocking resistance (U.S. Pat. No. 4,134,813, JP-A Nos. 1-253731 and 6-308727), but the exposure of image during the image formation process requires a long time.

It has also been suggested to use a phosphine compound for the purpose of enhancing the curability of the image surface so as to eventually enhance the blocking resistance (JP-A No. 7-126551). However, although the effect of enhancement could be obtained, sufficient crosslinking densities were not obtained, and the blocking resistance improving effect was insufficient.

As discussed above, there is an urgent demand for an ink composition that cures with high sensitivity to radiation, has excellent blocking resistance, and is capable of forming images excellent in smoothness.

SUMMARY

The present invention has been made in view of the above circumstances and provides an ink composition comprising: a polymer having a polyoxyalkylene group and a partial structure selected from the group consisting of a fluoroalkyl group, a siloxane skeleton and a long-chain alkyl group; a polymerizable compound; and a polymerization initiator.

DETAILED DESCRIPTION OF THE INVENTION

The operating mechanism of the ink composition of the present invention is speculated to be as follows.

When used as an ink composition, since the (A) polymer used in the invention has (A-2) a partial structure selected from the group consisting of a fluoroalkyl group, a siloxane skeleton and a long-chain alkyl group, the (A) polymer easily segregates at the surface when the ink composition is applied on a recording medium. In addition, since the surfaces of the ink droplets are covered by the polymer, the tackiness of the surfaces that is attributable to low molecular weight components or the like is suppressed. Thus, it is thought that the blocking resistance is enhanced. Furthermore, since the polymer of the invention has (A-1) a polyoxyalkylene group, when ink droplets in an uncured state land on the cured film, the wetting spreadability of the ink droplets is more satisfactory as compared to the case where the polymer does not have a polyoxyalkylene group, and it is therefore thought that smoother images may be obtained. Particularly, in a preferred embodiment of the invention, when the partial structure selected from the group consisting of a fluoroalkyl group, a siloxane skeleton and a long-chain alkyl group is present at the end of the polyoxyalkylene group, the smoothness of the images is further enhanced.

[Ink Composition]

The ink composition of the invention is characterized by including (A) a polymer (hereinafter, may be referred to as a specific polymer) having (A-1) a polyoxyalkylene group and (A-2) a partial structure (hereinafter, may be referred to as "segregation site") selected from the group consisting of a fluoroalkyl group, a siloxane skeleton and a long-chain alkyl group, (B) a polymerizable compound, and (C) a polymerization initiator.

Hereinafter, the components constituting the ink composition of the invention will be explained.

<(A) Polymer Having (A-1) Polyoxyalkylene Group and (A-2) Partial Structure Selected from the Group Consisting of Fluoroalkyl Group, Siloxane Skeleton and Long-Chain Alkyl Group>

The (A-1) polyoxyalkylene group may be a polyoxyethylene group, a polyoxypropylene group or a polytetrahydrofuran group, which are represented by the following formula (2), and according to a preferred form, two or more selected from the group of a polyoxyethylene group, a polyoxypropylene group and a polytetrahydrofuran group may be present in a same molecule. Furthermore, two or more of the polyoxyalkylene group, which is selected from the group of these polyoxyethylene group, polyoxypropylene group and polytetrahydrofuran group, may also be present in a molecule in the form of random copolymer or block copolymer.

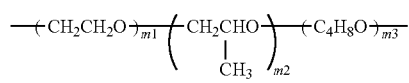 (2)

In the formula (2), m1, m2 and m3 are each independently an integer from 0 to 100. The total molecular weight of the polyoxyalkylene group is preferably from 150 to 5000, more preferably from 200 to 5000, and most preferably from 300 to 3000.

Preferred examples of the (A-1) polyoxyalkylene group include a polyoxyethylene group, a polyoxypropylene group and a polytetrahydrofuran group, and the polyoxyalkylene group may be in the form of a group having a number of oxyethylene groups and oxypropylene groups linked in a random fashion, a group having plural oxyethylene groups and plural oxypropylene groups linked in a block shape, or the like.

As a monomer having a polyoxyalkylene group in a side chain, commercially available polyalkylene glycol mono (meth)acrylates having terminal hydroxyl groups may be used. These commercially available monomers include the BLENMER series (trade name, manufactured by NOF Corp.), and examples of the commercially available monomers that may be used in the invention include BLENMER PE-90, BLENMER PE-200, BLENMER PE-350, BLENMER AE-90, BLENMER AE-200, BLENMER AE-400, BLENMER 70PEP-350B, BLENMER 10PEP-550B, and the like, while the BLENMER AEP series, BLENMER PET series and BLENMER AET series may also be used.

The monomer having a polyoxyalkylene group in a side chain may also be synthesized from a reaction between an acid halide and ethylene oxide or the like.

The specific polymer according to the invention is a polymer characterized by containing also the (A-2) partial structure selected from the group consisting of a fluoroalkyl group, a siloxane skeleton and a long-chain alkyl group, in addition to the (A-1) polyoxyalkylene group.

Hereinafter, the (A-2) partial structure selected from a fluoroalkyl group, a siloxane skeleton and a long-chain alkyl group will be described.

<Fluoroalkyl Group>

The fluoroalkyl group in the specific polymer according to the invention may be suitably a hydrocarbon group substituted with at least one fluorine atom, and an example may be a fluoroalkyl group in which at least one hydrogen atom of an alkyl group has been substituted by a fluorine atom. A perfluoroalkyl group in which all of the hydrogen atoms of the fluoroalkyl group have been substituted by fluorine atoms, is preferred, and a perfluoroalkyl group is more preferred.

The alkyl group is preferably a group having 3 to 12 carbon atoms, more preferably a group having 4 to 10 carbon atoms, and even more preferably a group having 6 to 8 carbon atoms.

It is favorable as long as the fluoroalkyl group is contained in the specific polymer, and it is still acceptable to have the fluoroalkyl group linked to the specific polymer via the polyoxyalkylene group.

The fluoroalkyl group according to the invention is preferably a group represented by the following formula (I), from the viewpoint of the property of uneven distribution at the ink surface.

Formula I

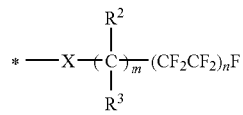

In the formula (I), $R^2$ and $R^3$ each represent a hydrogen atom or an alkyl group having 1 to 4 carbon atoms; the symbol * represents the site of linkage to the polymer chain; X represents a single bond or a divalent linking group; m represents an integer of 0 or greater; and n represents an integer of 1 or greater.

When there are two or more m's, the functional groups on adjacent carbon atoms (that is, between $R^2$'s, or between $R^3$'s, that are respectively bonded to adjacent carbon atoms) may be bonded to each other to form an aliphatic ring.

Among the substituents represented by the formula (I), a substituent in which n in the formula (I) is in the range of 1 to 10 is preferred, a substituent having n in the range of 1 to 4 is more preferred, and a substituent with n being 2 or 3 is particularly preferred. The site of linkage to the polymer chain as represented by the symbol * may be directly bonded to the main chain of the specific polymer, or may be bonded via a divalent linking group such as a polyoxyalkylene group, an alkylene group, an ester group, a urethane group, a cyclic alkylene group which may include a heteroatom, a poly(caprolactone), or an amino group. It is preferable that the site of linkage be bonded via a polyoxyalkylene group.

In regard to the method of introducing the fluoroalkyl group into the specific polymer via a polyoxyalkylene group, the fluoroalkyl group may be easily introduced to an end of the polyoxyalkylene group, using those compounds shown below.

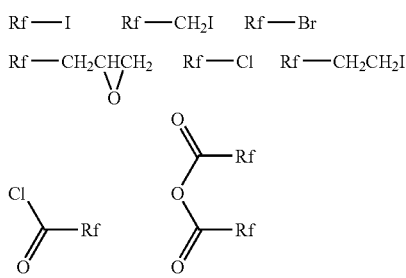

In the formulas above, Rf represents a group represented by the following formula. In the following formula, T is a group selected from the following (T group), and n2 is an integer from 0 to 6.

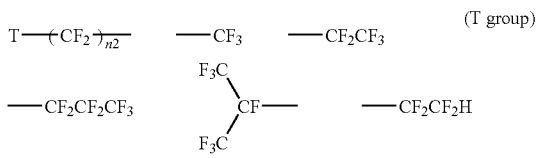

Furthermore, it is also possible to introduce the fluoroalkyl group to the specific polymer using a monomer having a fluoroalkyl group (hereinafter, referred to as fluoroalkyl group-containing monomer).

A preferable example of this fluoroalkyl group-containing monomer is a monomer represented by the following formula (II).

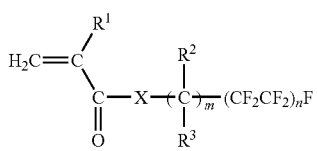

Formula II

In the formula (II), $R^1$ represents a hydrogen atom, a halogen atom, a methyl group which may be substituted, or an ethyl group which may be substituted. $R^2$, $R^3$, X, m and n all have the same meanings as defined for $R^2$, $R^3$, X, m and n in the formula (I), and preferred examples thereof are also as defined previously.

Here, examples of the halogen atom represented by $R^1$ in the formula (II) include a fluorine atom, a chlorine atom and a bromine atom.

The fluoroalkyl group-containing monomer is, even among the monomers represented by the formula (II), a monomer in which n in the formula (II) is from 1 to 10 is preferred, a monomer with n being from 1 to 4 is more preferred, and a monomer with n being 2 or 3 is particularly preferred.

Examples of the alkyl group having 1 to 4 carbon atoms as represented by $R^2$ and $R^3$ in the formula (I) and formula (II), include a methyl group, an ethyl group, a propyl group, an isopropyl group, an n-butyl group, an isobutyl group, a tert-butyl group, and the like. $R^2$ and $R^3$ are each preferably a hydrogen atom or a methyl group, and more preferably a hydrogen atom.

In the formula (I) and formula (II), when X is a single bond, it is meant that the carbon atom to which $R^2$ and $R^3$ are bonded, is directly bonded to the polymer main chain.

When X is a divalent linking group, the linking group may be —O—, —S—, —N($R^4$)—, —CO—, or the like. Among these, —O— is more preferred.

Here, $R^4$ represents a hydrogen atom or an alkyl group having 1 to 4 carbon atoms. Examples of the alkyl group include a methyl group, an ethyl group, a propyl group, an isopropyl group, an n-butyl group, an isobutyl group, a tert-butyl group, and the like. Preferably, $R^4$ is a hydrogen atom or a methyl group.

In the formula (I) and formula (II), m represents an integer of 0 or greater, and is preferably an integer from 2 to 8, and particularly preferably 2. When m is 2 or greater, the functional groups on adjacent carbon atoms (that is, between $R^2$'s, or between $R^3$'s, that are respectively bonded to adjacent carbon atoms) may be bonded to each other to form an aliphatic ring.

In the formula (I) and formula (II), n represents an integer of 1 or greater, and is preferably an integer from 1 to 10, more preferably an integer from 1 to 4, and particularly preferably 2 or 3.

In the formula (I), the symbol * represents the site of linkage to the polymer main chain, and examples of specific forms of the polymer main chain may include the following.

For example, an acrylic resin, a methacrylic resin, a styryl resin, a polyester resin, a polyurethane resin, a polycarbonate resin, a polyamide resin, a polyacetal resin, a phenol/formaldehyde condensate resin, a polyvinylphenol resin, a maleic anhydride/α-olefin resin, an α-hetero-substituted methacrylic resin, or the like may be used. Among them, an acrylic resin, a methacrylic resin, a styryl resin, a polyester resin, and a polyurethane resin are useful, and particularly, an acrylic resin, a methacrylic resin and a polyurethane resin are useful.

The specific polymer according to the invention may be easily obtained by a method that is known to those skilled in the art, such as a method of introducing the previously mentioned compound having a fluoroalkyl group, into the end of the polyoxyalkylene group, or a method of subjecting a monomer having a substituent as represented by the formula (I) (that is, a monomer having a fluoroalkyl group) to a polycondensation reaction, an addition polymerization or a ring-opening polymerization. Furthermore, these methods may also be used in combination according to necessity.

In addition, the production methods for such a fluoroalkyl group-containing compound are described in, for example, "Synthesis and Function of Fluorine Compounds" (reviewed by Ishikawa, Nobuo, published by CMC Publishing, Inc., 1987), pp. 117-118, or in "Chemistry of Organic Fluorine Compounds II" (Monograph 187, Ed. by Milos Hudlicky and Attila E. Pavlath, American Chemical Society, 1995), pp. 747-752.

Specific examples of the monomer represented by the formula (II) that is used in the invention, will be shown below. Among these, a structure having a fluoroalkyl group bonded to the polyoxyalkylene group is preferred, and this will be explained in the section for the formula (1) that will follow.

(Specific Examples of N=4)

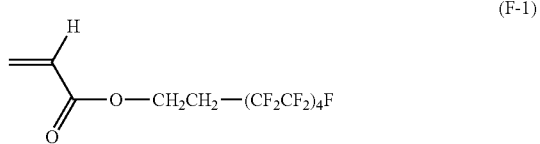

(F-1)

-continued
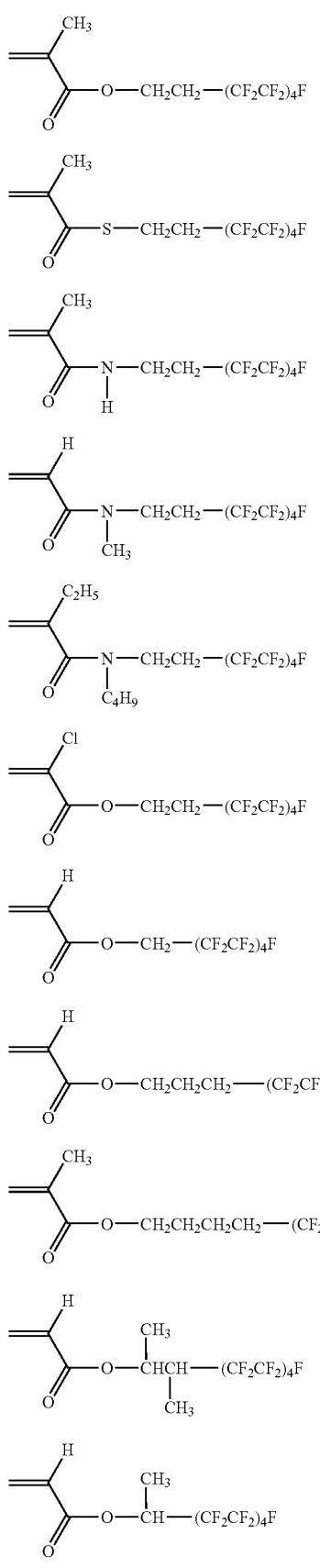
(Specific Examples of N=3)
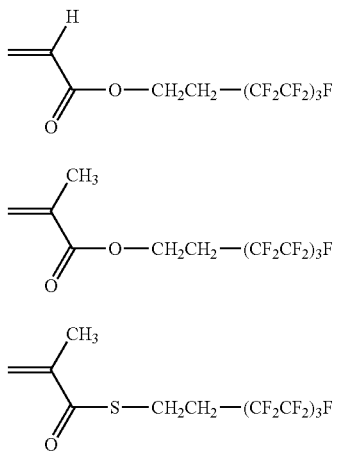
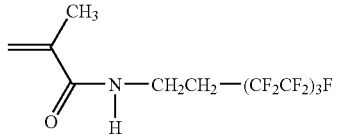
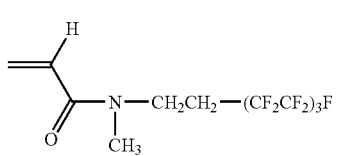
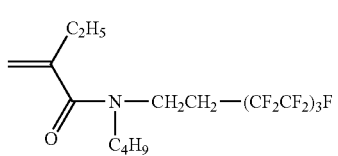
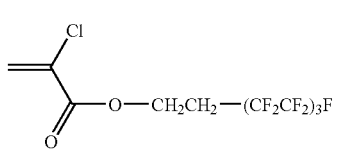
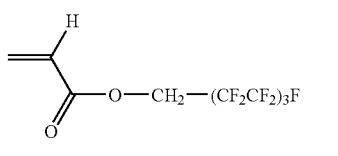
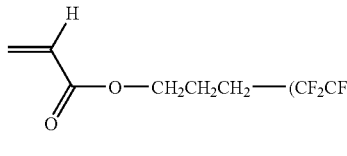
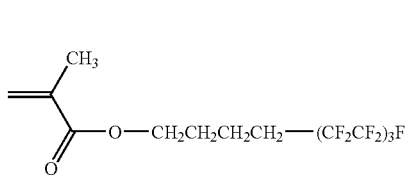

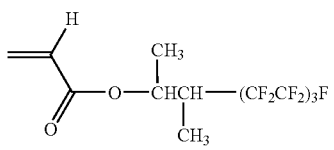 (F-23)
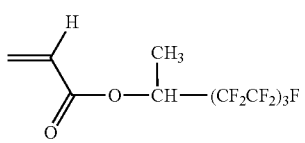 (F-24)
(Specific Examples of N=1)
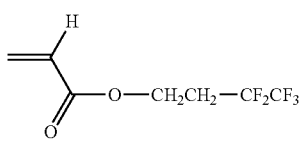 (F-25)
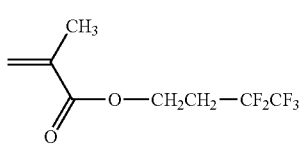 (F-26)
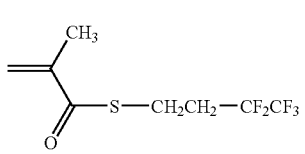 (F-27)
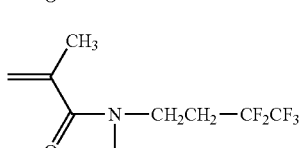 (F-28)
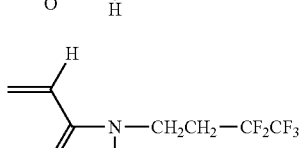 (F-29)
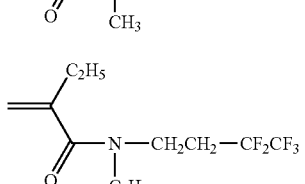 (F-30)
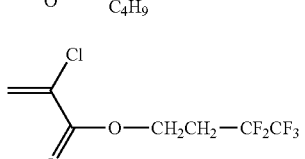 (F-31)
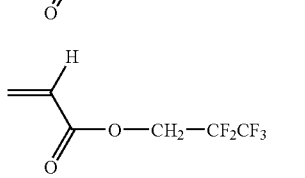 (F-32)
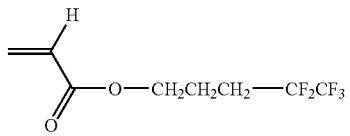 (F-33)
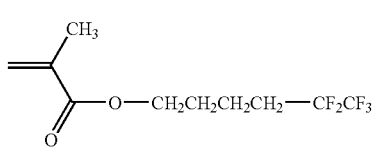 (F-34)
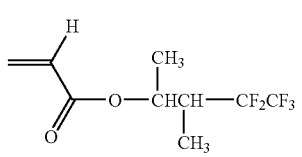 (F-35)
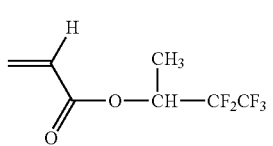 (F-36)
(Specific Examples of N=2)
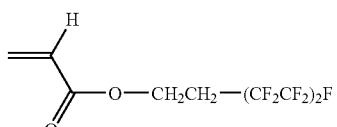 (F-37)
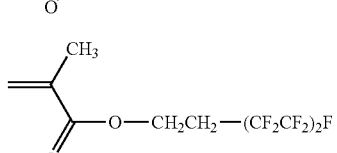 (F-38)
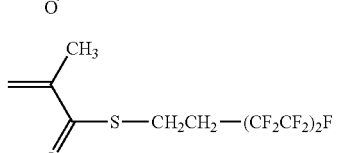 (F-39)
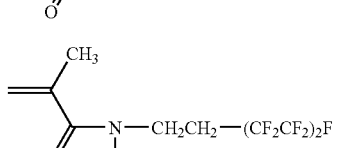 (F-40)
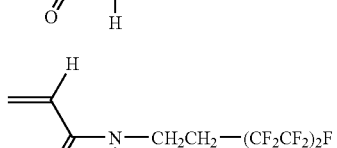 (F-41)
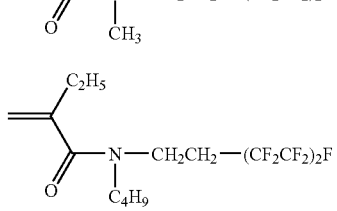 (F-42)

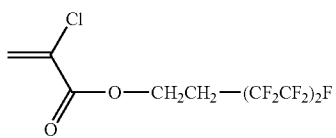
(F-43)

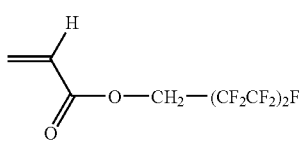
(F-44)

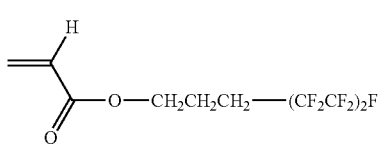
(F-45)

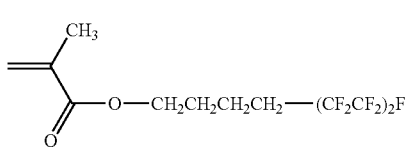
(F-46)

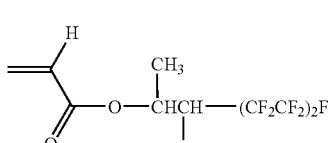
(F-47)

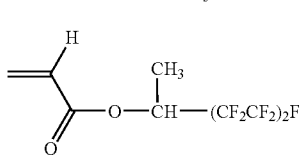
(F-48)

<Siloxane Skeleton>

The siloxane skeleton that is contained in the specific polymer together with the polyoxyalkylene group, is not particularly limited as long as the skeleton has the structure "—Si—O—Si—".

When the specific polymer has the siloxane skeleton, the jetting stability of the ink composition is increased, and the surface segregation properties may be increased when the ink composition is formed into a coating film. From this point of view, it is preferable to introduce a siloxane skeleton to the specific polymer by polymerizing a compound represented by the following structural formula (A) (hereinafter, may be referred to as "specific siloxane compound").

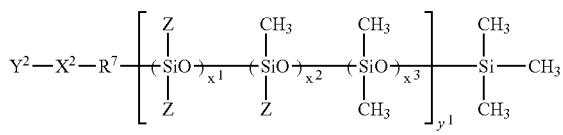
(A)

In the structural formula (A), $R^7$ represents a linear or branched alkylene group having 2 to 6 carbon atoms, which may be substituted with a substituent such as a hydroxyl group, an amine group or a halogen atom, or a divalent linking group represented by the following structural formula (B).

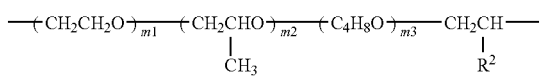
(B)

In the structural formula (B), $R^2$ represents a hydrogen atom, a methyl group, or an ethyl group; and m1, m2 and m3 have the same meanings as defined for m1, m2 and m3 in the formula (2). Here, two or more $R^2$'s are present in the structural formula (B), but they may be different from each other, or may be identical.

In the structural formula (A), $x^1$, $x^2$ and $x^3$ are integers such that their sum satisfies a number from 1 to 100.

$y^1$ represents an integer from 1 to 30.

In the structural formula (A), $X^2$ represents a single bond, or a divalent group represented by the following structural formula (C).

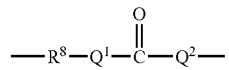
(C)

In the structural formula (C), $R^8$ represents a linear or branched alkylene group having 1 to 6 carbon atoms, which may be substituted with a substituent such as a hydroxyl group, an amine group or a halogen atom; $Q^1$ and $Q^2$ each represent an oxygen atom, a sulfur atom or —$NR^B$—, and $Q^1$ and $Q^2$ may be different from each other or may be identical. $R^B$ represents a hydrogen atom or an alkyl group having 1 to 4 carbon atoms.

In the structural formula (C), $Q^2$ is bonded to $R^7$ in the structural formula (A).

In the structural formula (A), $Y^2$ represents a monovalent group represented by one of the following structural formula (D) to structural formula (F).

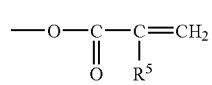
(D)

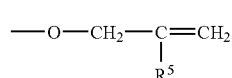
(E)

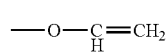
(F)

In the structural formulas (D) to (F), $R^5$ represents a hydrogen atom, or a linear or branched alkyl group having 1 to 6 carbon atoms.

In the structural formula (A), Z represents a monovalent group represented by the following structural formula (G).

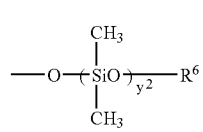
(G)

In the structural formula (G), $R^6$ represents an unsubstituted alkyl group having 1 to 4 carbon atoms; and $Y^2$ represents an integer from 1 to 100, and is preferably an integer from 1 to 50, and more preferably an integer from 1 to 20.

Furthermore, as for the siloxane skeleton of the invention, the structures shown below are listed as specific examples of the formula (A), but are not intended to be limited to these.

Among these, a structure in which the siloxane structure is bonded to the polymer via the polyoxyalkylene group is preferred, and this will be explained in the section for the formula (1) that will follow.

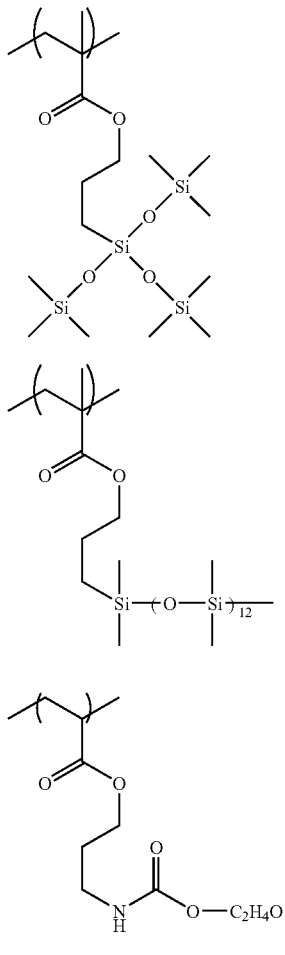

<Long-Chain Alkyl Group>

The long-chain alkyl group that is contained in the specific polymer together with the polyoxyalkylene group is an alkyl group having 4 to 12 carbon atoms, and a group of the following formula (3) is preferred.

In the formula (3), A represents a ring formed from a divalent to tetravalent hydrocarbon having 0 to 12 carbon atoms, a linear or branched alkyl group or a phenyl group; $R^{11}$ represents a linear or branched alkyl group having 6 to 20 carbon atoms; and n3 is an integer from 1 to 6.

This long-chain alkyl group may be introduced to the polymer in the state of being linked to the polymer main chain, but it is preferable that the long-chain alkyl group be bonded to the end of the polyoxyalkylene group.

In the formula (3), $R^{11}$ is preferably an alkyl group having 6 to 20 carbon atoms, and more preferably an alkyl group having 10 to 20 carbon atoms. Furthermore, n3 is preferably an integer from 1 to 6. When the substituents all fall in these ranges, the surface segregation properties are preferable.

In regard to the method of introducing such a group to the specific polymer, the groups may be introduced to the polymer by a method of copolymerizing a polymerizable compound having an unsaturated group, such as a vinyl compound or (meth)acryloyl compound having such a group, or the like.

A structure in which the long-chain alkyl group is bonded to the polymer via the polyoxyalkylene group is preferred, and this will be explained in the section for the formula (1) that will follow.

A preferable compound as the (A) specific polymer used in the invention is a polymer represented by the following formula (1) having a polyoxyalkylene group in a side chain, and having (A-2) a partial structure selected from the group consisting of a fluoroalkyl group, a siloxane skeleton and a long-chain alkyl group, at the end of the polyoxyalkylene group.

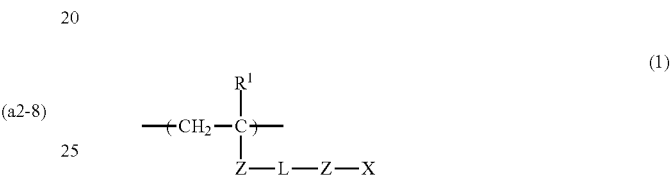

In the formula (1), $R^1$ represents a hydrogen atom or a methyl group; Z's each independently represent a divalent organic group; L represents a polyoxyalkylene group; and X represents a group selected from the group consisting of a fluoroalkyl group, a siloxane skeleton and a long-chain alkyl group.

Z in the formula (1) may be a linear or branched alkylene group having 1 to 20 carbon atoms, a cyclic alkylene group, a linear or branched alkenylene group having 2 to 20 carbon atoms, a cyclic alkenylene group, an alkynyl group having 2 to 20 carbon atoms, an arylene (monocyclic, heterocyclic) group having 6 to 20 carbon atoms, —OC(=O)—, —OC(=O)Ar—, —OC(=O)O—, —OC(=O)OAr—, —C(=O)NR—, —C(=O)NAr—, —SO$_2$NR—, —SO$_2$NAr—, —OAr— (aryleneoxy, polyaryleneoxy), —C(=O)O—, —C(=O)O—Ar—, —C(=O)Ar—, —C(=O)—, —SO$_2$—, —SO$_2$OAr—, —OSO$_2$—, —OSO$_2$Ar—, —NRSO$_2$—, —NArSO$_2$—, —NRC(=O)—, —NArC(=O)—, —NRC(=O)O—, —NArC(=O)O—, —OC(=O)NR—, —OC(=O)NAr—, —NAr—, —NR—, —N$^{30}$RR'—, —N$^+$RAr—, —N$^+$ArAr'—, —S—, —SAr—, —ArS—, a heterocyclic group (a 3- to 12-membered monocyclic or fused ring containing, for example, at least one of a nitrogen atom, an oxygen atom and a sulfur atom as a heteroatom), —OC(=S)—, —OC(=S)Ar—, —C(=S)O—, —C(=S)OAr—, —C(=S)OAr—, —C(=O)S—, —C(=O)SAr—, —ArC(=O)—, —ArC(=O)NR—, —ArC(=O)NAr—, —ArC(=O)O—, —ArC(=O)O—, —ArC(=O)S—, —ArC(=S)O—, —ArO—, —ArNR—, or the like.

In addition, R and R' each independently represent a hydrogen atom, a linear or branched alkyl group, a cyclic alkyl group, a linear or branched alkenyl group, a cyclic alkenyl group, a linear or branched alkynyl group, or a cyclic alkynyl group; and Ar and Ar' each independently represent an aryl group.

Among these linking groups, Z is preferably an arylene (monocyclic, heterocyclic) group having 6 to 20 carbon atoms, —C(=O)NR—, —C(=O)NAr—, —O— (including alkyleneoxy and polyalkyleneoxy), —OAr—(aryleneoxy, polyaryleneoxy), —C(=O)O—, —C(=O)O—Ar—, —C(=O)—, —C(=O)Ar—, —S—, —SAr—, —ArS—, —ArC(=O)—, —ArC(=O)O—, —ArC(=O)O—, —ArO—, —ArNR—, —C(=O)—, or the like, and is more preferably an arylene (monocyclic, heterocyclic) group having 6 to 20 carbon atoms, —C(=O)NR—, —C(=O)NAr—, —OAr—(aryleneoxy, polyaryleneoxy), —C(=O)O—, —C(=O)O—Ar—, —SAr—, —ArS—, —ArC(=O)—, —ArC(=O)O—, —ArC(=O)O—, —ArO—, —ArNR—, —C(=O)—, or the like.

According to the invention, the linking group represented by Z may also be a combination of two or more kinds of the linking groups listed herein.

L is a polyoxyalkylene group represented by the following formula (2), and m1, m2 and m3 are each independently integers from 0 to 100. Preferably, m1 is in the range of 0 to 20, m2 is in the range of 0 to 20, and m3 is in the range of 0 to 20. In these ranges, the image smoothness and sensitivity are satisfactory.

The total molecular weight of the polyoxyalkylene group is preferably from 150 to 5000, more preferably from 200 to 5000, and most preferably from 300 to 3000. When the molecular weight is in this range, the image smoothness is satisfactory.

$$-\!\!\left(\!CH_2CH_2O\!\right)_{\!m1}\!\!\left(\!CH_2CHO\!\atop CH_3\!\right)_{\!m2}\!\!\left(\!C_4H_8O\!\right)_{\!m3}\!\!- \qquad (2)$$

Specific examples of the structural unit represented by the formula (1) will be shown below, but the invention is not intended to be limited to the following structural units. Furthermore, a polymer including two or more of the structures shown below may also be suitably used.

It is also preferable to construct the specific polymer of the invention by copolymerizing a monomer containing the structural unit represented by the formula (1) and a monomer having another structural unit.

Specific examples of the structure in which a polyfluoroalkyl group is bonded to the polymer via a polyoxyalkylene group, are shown below.

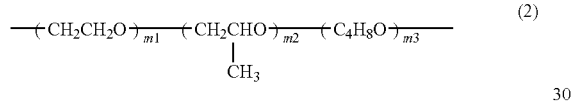

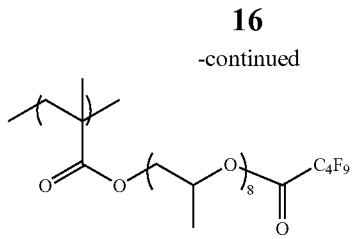

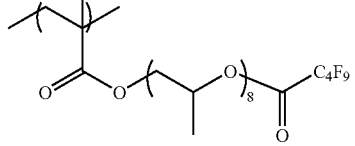

Furthermore, specific examples of the structure in which a siloxane skeleton is bonded to the polymer via a polyoxyalkylene group, are shown below. In the formulas shown below, R represents a divalent linking group.

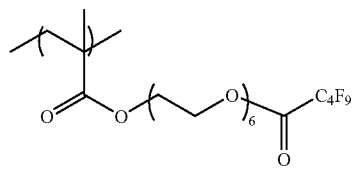

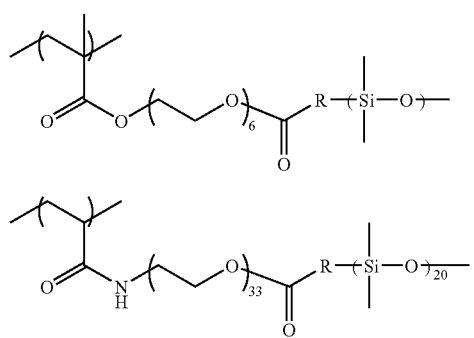

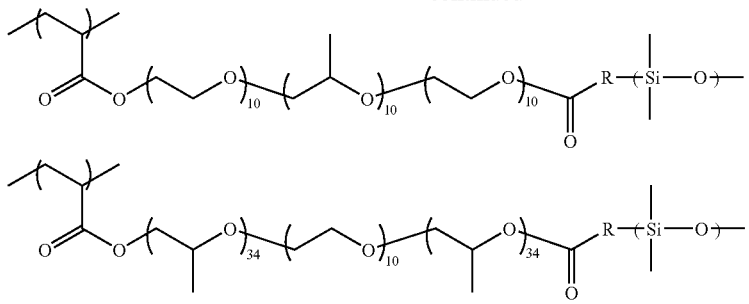

Specific examples of the structure in which a long-chain alkyl group is bonded to the polymer via a polyoxyalkylene group, are shown below.

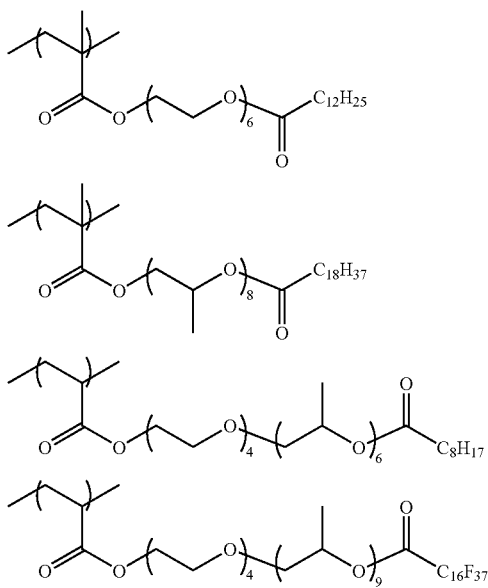

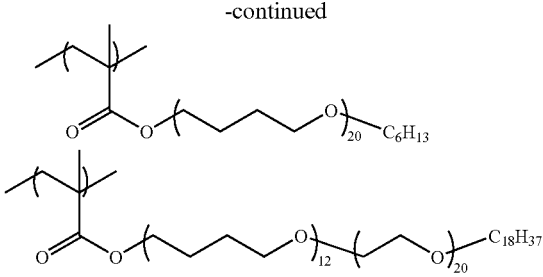

The content of the (A-1) polyoxyalkylene group according to the invention is preferably 5% by weight to 50% by weight, more preferably 10% by weight to 30% by weight, and even more preferably 10% by weight to 20% by weight, based on the weight of the specific polymer.

The content of the (A-2) partial structure selected from the group consisting of a fluoroalkyl group, a siloxane skeleton and a long-chain alkyl group is preferably 1% by weight to 40% by weight, more preferably 1.5% by weight to 30% by weight, and even more preferably 2% by weight to 20% by weight, based on the weight of the specific polymer.

When the contents fall in these ranges, the specific polymer efficiently under surface segregation in the ink composition, and the smoothness is enhanced.

Suitable specific examples of the (A) specific polymer used in the invention will be listed below, together with the structure and weight average molecular weight.

a-1

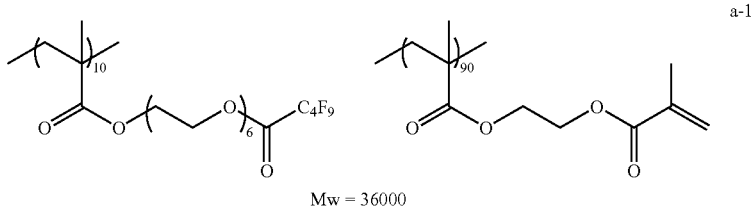

Mw = 36000 a-2

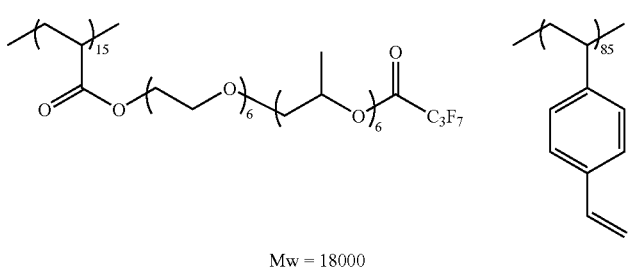

Mw = 18000

-continued
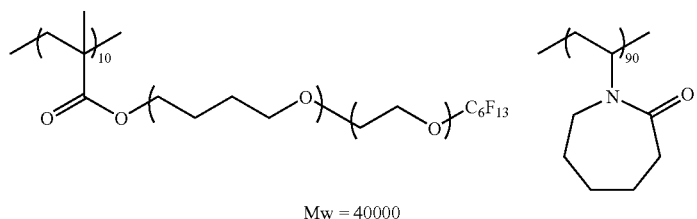
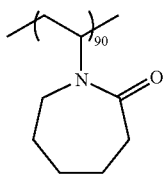
a-3
Mw = 40000
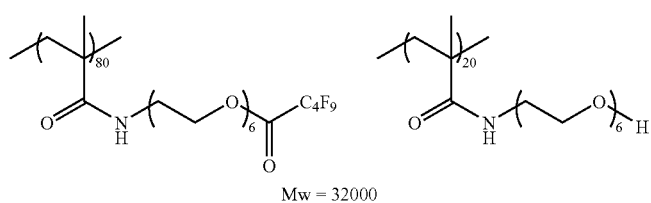
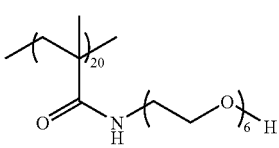
a-4
Mw = 32000
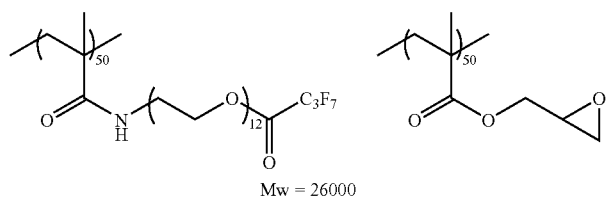
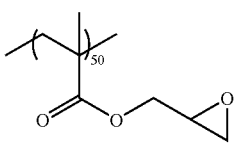
a-5
Mw = 26000
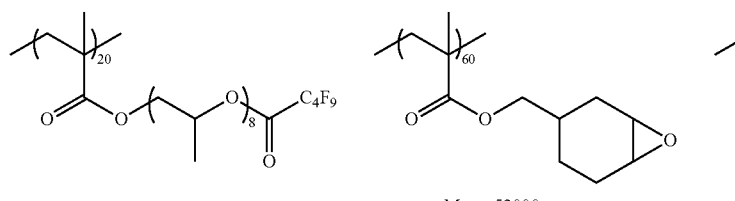
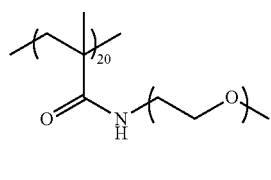
a-6
Mw = 52000
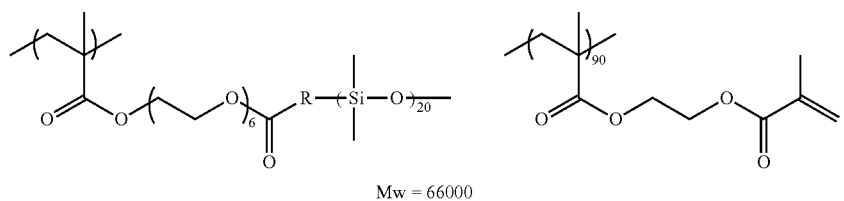
a-7
Mw = 66000
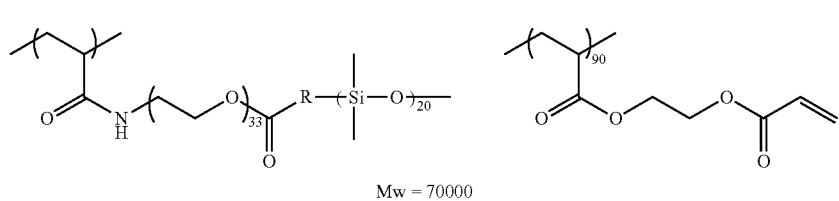
a-8
Mw = 70000
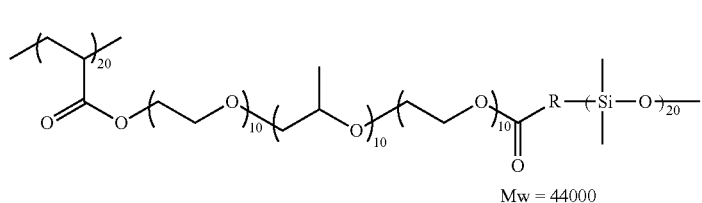
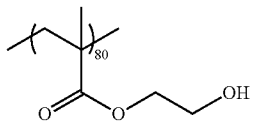
a-9
Mw = 44000

-continued
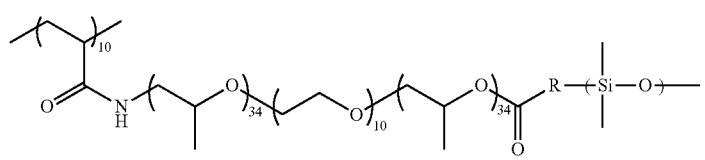 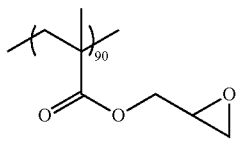
a-10
Mw = 40000
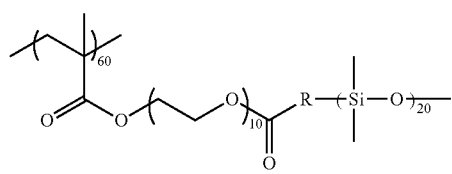 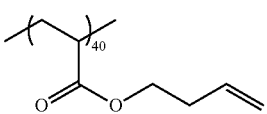
a-11
Mw = 12000
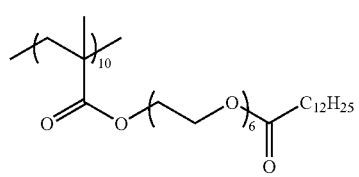 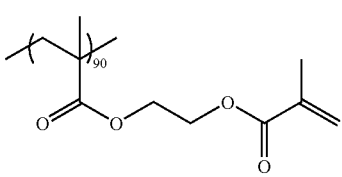
a-12
Mw = 22000
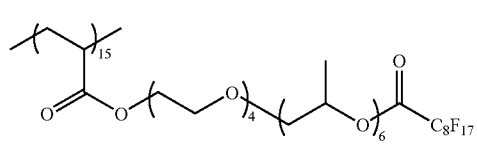 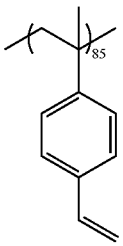
a-13
Mw = 20000
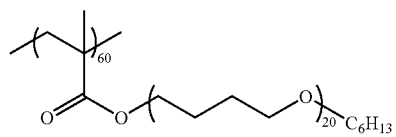 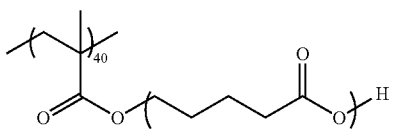
a-14
Mw = 55000
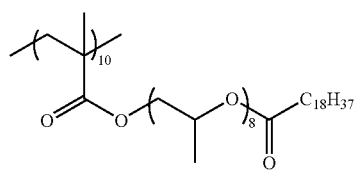 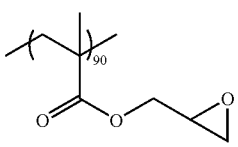
a-15
Mw = 38000
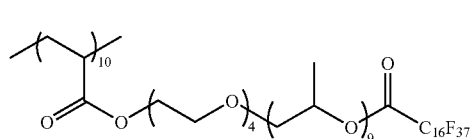 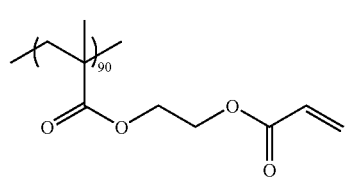
a-16
Mw = 24000

The content of the specific polymer relative to the total solids content of the ink composition in the invention is, on a weight basis, preferably in the range of 0.2% by weight to 5% by weight, more preferably in the range of 0.2% by weight to 3% by weight, and even more preferably in the range of 0.2% by weight to 1.5% by weight. When the content falls in the above range, smoothness is enhanced without any adverse effect exerted to the properties required of inkjet ink, and blocking suppression may be enhanced.

<(B) Polymerizable Compound>

The ink composition of the invention includes a polymerizable compound.

This polymerizable compound is (B-1) a compound having at least one radical polymerizable, ethylenically unsaturated bond in the molecule, or (B-2) a compound having at least one of a cationically polymerizable epoxy ring, an oxetane ring or a vinyl ether group. One type of the polymerizable compound may be used alone, or two or more types of the polymerizable compound may be used in combination at an arbitrary ratio so as to enhance the desired characteristics. It is preferable to use two or more types in combination for controlling the performance such as reactivity and properties. It is also acceptable to use a radical polymerizable compound and a cationically polymerizable compound in combination.

<(B-1) Radical Polymerizable Compound>

Examples of the polymerizable compound having a radical polymerizable, ethylenically unsaturated bond, include unsaturated carboxylic acids such as acrylic acid, methacrylic acid, itaconic acid, crotonic acid, isocrotonic acid and maleic acid, and salts thereof, anhydrides having an ethylenically unsaturated group, acrylonitrile, styrene, as well as radical polymerizable compounds such as various unsaturated polyesters, unsaturated polyethers, unsaturated polyamides and unsaturated urethanes, and the like.

Specific examples include acrylic acid derivatives such as 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acryloxypolyethoxyphenyl)propane, neopentyl glycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylate, N-methylolacrylamide, diacetone acrylamide and epoxy acrylate; methacrylic acid derivatives such as methyl methacrylate, n-butyl methacrylate, 2-ethylhexyl methacrylate, lauryl methacrylate, allyl methacrylate, glycidyl methacrylate, benzyl methacrylate, dimethylaminomethyl methacrylate, 1,6-hexanediol dimethacrylate, ethylene glycol dimethacrylate, triethylene glycol dimethacrylate, polyethylene glycol dimethacrylate, polypropylene glycol dimethacrylate, trimethylolethane trimethacrylate, trimethylolpropane trimethacrylate and 2,2-bis(4-methacryloxypolyethoxyphenyl)propane; and derivatives of allyl compounds such as allyl glycidyl ether, diallyl phthalate and triallyl trimellitate. More specifically, those radical polymerizable or crosslinkable monomers, oligomers and polymers, commercially available or known in the related art, which are described in "Handbook of Crosslinking Agents," edited by Yamashita, Shinzo (1981, Taiseisha, Ltd.); "UV-EB Curing Handbook (Raw Materials Part)," edited by Kato, Kiyoshi (1985, Kobunshi Kankokai); "Applications and Markets of UV-EB Curing Technology," edited by Radtech Japan, p. 79 (1989, CMC Publishing, Inc.); "Handbook of Polyester Resins," edited by Takiyama, Eiichiro (1988, Nikkan Kogyo Shimbun, Ltd.); and the like, may be used.

Also known as the radical polymerizable compound are photocurable type polymerizable compound materials used in photopolymerizable compositions, which are described in, for example, JP-A No. 7-159983, JP-B No. 7-31399, JP-A Nos. 8-224982, 10-863 and 9-134011, and the like. These materials may also be applied to the ink composition of the invention.

<(B-2) Cationically Polymerizable Compound>

The epoxy compounds that may be used in the polymerizable composition of the invention include aromatic epoxides, alicyclic epoxides, aliphatic epoxides, and the like, and among these, alicyclic epoxides are preferred from the viewpoint of curability.

Preferred examples of the alicyclic epoxides include cyclohexene oxide- or cyclopentene oxide-containing compounds, which are obtained by epoxidizing compounds having at least one cycloalkane rings such as cyclohexene or cyclopentene rings, with an appropriate oxidizing agent such as hydrogen peroxide or peracid.

As for the type, specific compounds and preferred examples of epoxides that may be used in the polymerizable composition of the invention, there may be mentioned the compounds described in paragraphs [0037] to [0040] of JP-A No. 2008-13646, and the like, and these may also be applied to the invention.

In regard to the oxetane compounds that may be used in combination in the invention, monofunctional and polyfunctional compounds may all be used, and any known oxetane compound such as those described in JP-A Nos. 2001-220526, 2001-310937 and 2003-341217 may be selected and used. The compound having an oxetane ring that may be used in combination with the specific polymerizable compound according to the invention, is preferably a compound having 1 to 4 oxetane rings in its structure. When use is made of such a compound, it is easy to maintain the viscosity of the composition in the range which makes the handlability of the composition good, and higher adhesiveness between the composition after curing and the recording medium may be obtained when applied to ink compositions and the like. As for the type, specific compounds and preferred examples of oxetane compounds that may be used in the polymerizable composition of the invention, there may be mentioned the compounds described in paragraphs [0045] to [0062] of JP-A No. 2008-13646, and the like, and these may also be applied to the invention.

Furthermore, it is also preferable to use a vinyl ether compound as the cationically polymerizable compound. Examples of the vinyl ether compound that may be suitably used include di- or trivinyl ether compounds such as ethylene glycol divinyl ether, ethylene glycol monovinyl ether, diethylene glycol divinyl ether, triethylene glycol monovinyl ether, triethylene glycol divinyl ether, propylene glycol divinyl ether, dipropylene glycol divinyl ether, butanediol divinyl ether, hexanediol divinyl ether, cyclohexanedimethanol divinyl ether, hydroxyethyl monovinyl ether, hydroxynonyl monovinyl ether, and trimethylolpropane trivinyl ether; monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-O-propylene carbonate, dodecyl vinyl ether, diethylene glycol monovinyl ether, and octadecyl vinyl ether; and the like.

Among these vinyl ether compounds, divinyl ether compounds and trivinyl ether compounds are preferred from the viewpoint of curability, adhesiveness and surface hardness, and particularly divinyl ether compounds are preferred. The vinyl ether compounds may be used singly, or may be used in combination of two or more kinds.

In the ink composition of the invention, the content of the (B) polymerizable compound is preferably 60% by weight or more and 95% by weight or less.

Since many of the polymerizable compounds are solid or exhibit high viscosity properties at normal temperature, it is preferable to use a monofunctional polymerizable monomer from the viewpoint of the preparation of uniform ink composition, handlability, and the ink jetting stability in the case of using the ink composition for the purpose of inkjet recording.

When a monofunctional polymerizable compound is used, the cured film becomes flexible, which is preferable. The content of the monofunctional polymerizable compound is preferably 80% by weight or more and 100% by weight or less, and more preferably 90% by weight or more and 100% by weight or less, relative to the total amount of the polymerizable compound.

<(C) Photopolymerization Initiator>

The ink composition of the invention includes (C) a photopolymerization initiator. In regard to the (C) photopolymerization initiator, a known polymerization initiator may be appropriately selected for use, according to the type of the (B) polymerizable compound that is used in combination, and the intended use of the ink composition.

The (C) photopolymerization initiator used in the ink composition of the invention is a compound which absorbs external energy (light) and produces a polymerization initiating species. Examples of the light include active radiations, that is, γ-rays, β-rays, electron beams, ultraviolet radiation, visible radiation and infrared radiation.

When a radical polymerizable compound is used as the polymerizable compound, it is preferable to use a radical polymerization initiator as the (C) photopopolymerization initiator of the invention, and when a cationically polymerizable compound is used, it is preferable to use a cationic polymerization initiator. When both a radical polymerizable compound and a cationically polymerizable compound are used as the polymerizable compounds, it is preferable to use a radical polymerization initiator and a cationic polymerization initiator in combination for the polymerization initiator as well.

<(C-1) Radical Polymerization Initiator>

In regard to the (C) photopolymerization initiator, a known compound may be used, but among those preferred (C) photopolymerization initiators that may be used in the invention, examples of the (C-1) radical polymerization initiator include (a) an aromatic ketone, (b) an acylphosphine oxide compound, (c) an aromatic onium salt compound, (d) an organic peroxide, (e) a thio compound, (f) a hexaarylbiimidazole compound, (g) a ketoxime ester compound, (h) a borate compound, (i) an azinium compound, (j) a metallocene compound, (k) an active ester compound, (l) a compound having a carbon-halogen bond, (m) an alkylamine compound, and the like.

These radical polymerization initiators may be used such that the compounds of (a) to (m) are used singly or in combination. The radical polymerization initiator according to the invention is suitably used by using these compounds singly or in combination of two or more kinds.

Preferred examples of the (a) aromatic ketone, (b) acylphosphine compound and (e) thio compound include those compounds having a benzophenone skeleton or thioxantone skeleton as described in "Radiation Curing in Polymer Science and Technology," J. P. Fouassier, J. F. Rabek (1993), pp. 77-117, and the like. More preferred examples include the α-thiobenzophenone compounds described in JP-B No. 47-6416; the benzoin ether compounds described in JP-B No. 47-3981; the α-substituted benzoin compounds described in JP-B No. 47-22326; the benzoin derivatives described in JP-B No. 47-23664; the aroylphosphonic acid esters described in JP-A No. 57-30704; the dialkoxybenzophenones described in JP-B No. 60-26483; the benzoin ethers described in JP-B No. 60-26403 and JP-A No. 62-81345; the α-aminobenzophenones described in JP-B No. 1-34242, U.S. Pat. No. 4,318, 791 and EP No. 0,284,561 A1; the p-di(dimethylaminobenzoyl)benzene described in JP-A No. 2-211452; the thiosubstituted aromatic ketones described in JP-A No. 61-194062; the acylphosphine sulfide described in JP-B No. 2-9597; the acylphosphines described in JP-B No. 2-9596; the thioxanthones described in JP-B No. 63-61950; the coumarins described in JP-B No. 59-42864; and the like.

Among these, it is preferable to use an acylphosphine oxide compound as the polymerization initiator in the invention, and bis(2,4,6-trimethylbenzoyl)-phenylphosphine oxide (trade name: IRGACURE 819, manufactured by Ciba Specialty Chemicals Corp.), bis(2,6-dimethoxybenzoyl)-2,4,4-trimethylpentylphenylphosphine oxide, 2,4,6-trimethylbenzoyldiphenylphosphine oxide (trade name: DAROCUR TPO; manufactured by Ciba Specialty Chemicals Corp.; trade name: LUCIRIN TPO, manufactured by BASF Corp.), and the like are preferred.

Examples of the (c) aromatic onium salt compound include aromatic onium salts of the elements of Groups 15, 16 and 17 of the Periodic Table of Elements, specifically such as N, P, As, Sb, Bi, O, S, Se, Te and I. For example, the iodonium salts described in EP No. 104,143, U.S. Pat. No. 4,837,124, JP-A Nos. 2-150848 and 2-96514; the diazonium salts (benzenediazonium which may be substituted, and the like) described in EP Nos. 370,693, 233, 567, 297, 443, 297, 442, 279,210 and 422,570, U.S. Pat. Nos. 3,902,144, 4,933,377, 4,760,013, 4,734,444 and 2,833,827; diazonium salt resins (formaldehyde resins of diazodiphenylamine, and the like); N-alkoxypyridinium salts (for example, those described in U.S. Pat. No. 4,743,528, JP-A Nos. 63-138345, 63-142345 and 63-142346, and JP-B No. 46-42363, specifically such as 1-methoxy-4-phenylpyridinium tetrafluoroborate); and the compounds described in JP-B Nos. 52-147277, 52-14278 and 52-14279, are suitably used. They are active species and generate radicals or acids.

The (d) organic peroxide includes almost all of organic compounds having one or more oxygen-oxygen bond in the molecule, but preferred examples thereof include peroxide ester-based compounds such as 3,3',4,4'-tetra(t-butylperoxycarbonyl)benzophenone, 3,3',4,4'-tetra(t-amylperoxycarbonyl)benzophenone, 3,3',4,4'-tetra(t-hexylperoxycarbonyl) benzophenone, 3,3',4,4'-tetra(t-octylperoxycarbonyl) benzophenone, 3,3',4,4'-tetra(cumylperoxycarbonyl) benzophenone, 3,3',4,4'-tetra(p-isopropylcumylperoxycarbonyl)benzophenone, and di-t-butyl diperoxyisophthalate.

Examples of the (f) hexaarylbiimidazole compound include the rofin dimers described in JP-B Nos. 45-37377 and 44-86516, for example, 2,2'-bis(o-chlorophenyl)-4,4'-5,5'-tetraphenylbiimidazole, 2,2'-bis(o-bromophenyl)-4,4',5,5'-tetraphenylbiimidazole, 2,2'-bis(o,p-dichlorophenyl)-4,4',5, 5'-tetraphenylbiimidazole, 2,2'-bis(o-chlorophenyl)-4,4',5, 5'-tetra(m-methoxyphenyl)biimidazole, 2,2'-bis(o,o'-dichlorophenyl)-4,4'-5,5'-tetraphenylbiimidazole, 2,2'-bis(o-nitrophenyl)-4,4',5,5'-tetraphenylbiimidazole, 2,2'-bis(o- methylphenyl)-4,4',5,5'-tetraphenylbiimidazole, 2,2'-bis(o-trifluorophenyl)-4,4',5,5'-tetraphenylbiimidazole, and the like.

Examples of the (g) ketoxime ester compound include 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one, 2-ethoxycarbonyloxyimino-1-phenylpropan-1-one, and the like.

Examples of the (h) borate compound include the compounds described in U.S. Pat. Nos. 3,567,453 and 4,343,891, EP Nos. 109,772 and 109,773.

Examples of the (i) azinium salt compound include the group of compounds having an N—O bond, described in JP-A Nos. 63-138345, 63-142345, 63-142346 and 63-143537, and JP-B No. 46-42363.

Examples of the (j) metallocene compound include the titanocene compounds described in JP-A Nos. 59-152396, 61-151197, 63-41484, 2-249 and 2-4705; and the iron-arene complexes described in JP-A Nos. 1-304453 and 1-152109.

Specific examples of the titanocene compounds include dicyclopentadienyl-Ti-dichloride, dicyclopentadienyl-Ti-bisphenyl, dicyclopentadienyl-Ti-bis-2,3,4,5,6-pentafluorophen-1-yl, dicyclopentadienyl-Ti-bis-2,3,5,6-tetrafluorophen-1-yl, dicyclopentadienyl-Ti-bis-2,4,6-trifluorophen-1-yl, dicyclopentadienyl-Ti-2,6-difluorophen-1-yl, dicyclopentadienyl-Ti-bis-2,4-difluorophen-1-yl, dimethylcyclopentadienyl-Ti-bis-2,3,4,5,6-pentafluorophen-1-yl, dimethylcyclopentadienyl-Ti-bis-2,3,5,6-tetrafluorophen-1-yl, dimethylcyclopentadienyl-Ti-bis-2,4-difluorophen-1-yl, bis(cyclopentadienyl)-bis(2,6-difluoro-3-(pyrr-1-yl)phenyl)titanium, bis(cyclopentadienyl)-bis[2,6-difluoro-3-(methylsulfonamido)phenyl]titanium, bis(cyclopentadienyl)-bis[2,6-difluoro-3-(N-butylbiaroylamino)phenyl]titanium, and the like.

Examples of the (k) active ester compound include the nitrobenzyl ester compounds described in EP Nos. 0,290,750, 046, 083, 156, 153, 271,851 and 0,388,343, U.S. Pat. Nos. 3,901,710 and 4,181,531, JP-A Nos. 60-198538 and 53-133022; the iminosulfonate compounds described in EP Nos. 0,199,672, 84,515, 199, 672, 044,115 and 0,101,122, U.S. Pat. Nos. 4,618,564, 4,371,605 and 4,431,774, JP-A Nos. 64-18143, 2-245756 and 4-365048; the compounds described in JP-B Nos. 62-6223 and 63-14340, and JP-A No. 59-174831, and the like.

Preferred examples of the (l) compound having a carbon-halogen bond include, for example, the compounds described in Wakabayashi, et al., Bull. Chem. Soc. Japan, 42, 2924 (1969); the compounds described in GB No. 1388492; the compounds described in JP-A No. 53-133428; the compounds described in DE No. 3337024; and the like.

Further examples include the compounds described in F. C. Schaefer, et al., J. Org. Chem., 29, 1527 (1964); the compounds described in JP-A No. 62-58241; the compounds described in JP-A No. 5-281728; and the like. Still further examples include the compounds described in DE No. 2641100; the compounds described in DE No. 3333450; the group of compounds described in DE No. 3021590; or the group of compounds described in DE No. 3021599; and the like.

The (C-1) radical polymerization initiator according to the invention may be used singly, or may be used in combination. From the viewpoint of effects, it is preferable to use two or more kinds of the (C-1) radical polymerization initiators in combination.

<(C-2) Cationic Polymerization Initiator>

When the (B-2) cationically polymerizable compound is used as the (B) polymerizable compound according to the invention, it is preferable that the composition include (C-2) a cationic polymerization initiator as the (C) photopolymerization initiator. Examples of the (C-2) cationic polymerization initiator include known photoacid generators. Here, the term photoacid generator means a compound that generates acid upon irradiation with a radiation.

The photoacid generator that may be used in the invention may be appropriately selected for use from a photoinitiator for photocationic polymerization, a photodecolorant such as a dye, a photochromic agent, and a compound capable of generating acid upon irradiation with the light used in microresists or the like (ultraviolet radiation having a wavelength of 400 to 200 nm, far-ultraviolet radiation, particularly preferably g-rays, h-rays, i-rays, or KrF excimer laser light), ArF excimer laser light, electron beams, X-rays, molecular beams, ion beams or the like.

Examples of such a photocationic polymerization initiator include onium salt compounds such as a diazonium salt, a phosphonium salt, a sulfonium salt and an iodonium salt; sulfonate compounds such as imidosulfonate, oxime-sulfonate, diazodisulfone, disulfone and o-nitrobenzyl sulfonate; and the like, all of which decompose when irradiated with a radiation and generate acid. As for the type, specific compounds and preferred examples of the photocationic polymerization initiator that may be used in the polymerizable composition of the invention, there may be mentioned the compounds described in paragraphs [0066] to of JP-A No. 2008-13646, and the like, and these may also be applied to the invention.

The polymerization initiators may be used singly, or in combination of two or more kinds.

The content of the polymerization initiator in the ink composition, including the cases of being applied to ink compositions, is preferably from 0.1 to 20% by weight, more preferably from 0.5 to 10% by weight, and even more preferably from 1 to 7% by weight, in terms of solids content.

(Sensitizer)

The ink composition of the invention may be further added with a sensitizer that accelerates polymerization and curing, and it is preferable to use an anthracene compound as the sensitizer. The anthracene compound may be substituted with a substituent.

When the anthracene compound has a substituent, examples of the substituent include an alkyl group, an alkoxy group, an aryloxy group and the like, and among them, an alkoxy group having 1 to 4 carbon atoms is particularly preferred. In addition, the number of substituents for the anthracene is preferably 1 to 4, and more preferably 1 to 2. Particularly, the position of the substituent in the case of monosubstitution is preferably the 9-position, and the position of the substituent in the case of bisubstitution is preferably the 9-position and the 10-position.

Even among these, the sensitizer is particularly preferably a 9,10-substituted anthracene compound, which is an example of bisubstitution at the 9-position and the 10-position.

The content of the anthracene compound mentioned above is preferably from 35 to 100% by weight, more preferably from 40 to 80% by weight, and even more preferably from 44 to 70% by weight, relative to the total weight of the polymerization initiator. Furthermore, it is preferable that the preferred content of the polymerization initiator previously mentioned and the preferred content of the anthracene compound be simultaneously set to the respective ranges.

According to the invention, another sensitizing dye other than the anthracene compound may also be added. The other sensitizing dye may be used singly, or in combination with the anthracene compound. The sensitizer other than the anthracene compound related to the invention may be a compound that belongs to the compound family listed below and has an absorption wavelength in the wavelength region of 350 nm to 450 nm.

Examples of the other sensitizer include polynuclear aromatics (for example, pyrene, perylene, triphenylene, 2-ethyl-9,10-dimethoxyanthracene and the like), xanthenes (for example, fluorescein, eosin, erythrosine, rhodamine B, Rose Bengal and the like), cyanines (for example, thiacarbocyanine, oxacarbocyanine and the like), merocyanines (for example, merocyanine, carbomerocyanine and the like), thiazines (for example, thionine, methylene blue, toluidine blue and the like), acridines (for example, acridine orange, chroroflavin, acriflavin and the like), anthraquinones (for example, anthraquinones and the like), squaryliums (for example, squarylium and the like), coumarins (for example, 7-diethylamino-4-methylcoumarin and the like), and the like.

The content of the sensitizer in the ink composition of the invention is preferably from 0.01 to 20% by weight, more preferably from 0.1 to 15% by weight, and even more preferably from 0.5 to 10% by weight, relative to the total weight of the ink composition, from the viewpoint of the colorability of the ink composition. The sensitizing dye may be used singly, or may be used in combination of two or more kinds The content ratio (a/c) of the sensitizing dye (c) and the polymerization initiator (a) in the ink composition is preferably such that the ratio a/c=100 to 0.5, more preferably a/c=50 to 1, and even more preferably a/c=10 to 1.5, by weight, from the viewpoint of an enhancement of the decomposition ratio of the polymerization initiator, and the permeability of the irradiated light.

The ink composition of the invention may be further added with a known compound having an effect such as of further enhancing the sensitivity as a co-sensitizer, or suppressing the polymerization inhibition by oxygen.

Examples of the co-sensitizer include amines, for example, the compounds described in M. R. Sander et al., "Journal of Polymer Society", Vol. 10, p. 3173 (1972); JP-B No. 44-20189, JP-A Nos. 51-82102, 52-134692, 59-138205, 60-84305, 62-18537 and 64-33104; and Research Disclosure No. 33825. Specific examples include triethanolamine, p-dimethylaminobenzoic acid ethyl ester, p-formyldimethylaniline, p-methylthiodimethylaniline, and the like.

Other examples of the co-sensitizer include thiols and sulfides, for example, the thiol compounds described in JP-A No. 53-702, JP-B No. 55-500806 and JP-A No. 5-142772; and the disulfide compounds described in JP-A No. 56-75643; and the like. Specific examples include 2-mercaptobenzothiazole, 2-mercaptobenzoxazole, 2-mercaptobenzoimidazole, 2-mercapto-4(3H)-quinazoline, β-mercaptonaphthalene, and the like.

Still other examples of the co-sensitizer include amino acid compounds (for example, N-phenylglycine and the like); the organometallic compounds described in JP-B No. 48-42965 (for example, tributyltin acetate and the like); the hydrogen donors described in JP-B No. 55-34414; the sulfur compounds described in JP-A No. 6-308727 (for example, trithiane and the like); the phosphorus compounds described in JP-A No. 6-250387 (for example, diethyl phosphite and the like); Si—H and Ge—H compounds; and the like.

The amount of addition is appropriately selected according to the purpose, but in general, the amount is about 0.01 to 10% by weight relative to the total amount (total weight) of the ink composition.

<Surfactant>

It is preferable to incorporate a known surfactant into the ink composition of the invention. Examples of the known surfactant include those described in JP-A Nos. 62-173463 and 62-183457. Specific examples thereof include anionic surfactants such as dialkylsulfosuccinic acid salts, alkylnaphthalenesulfonic acid salts and fatty acid salts; nonionic surfactants such as polyoxyethylene alkyl ethers, polyoxyethylene alkylaryl ethers, acetylene glycols, and polyoxyethylene-polyoxypropylene block copolymers; and cationic surfactants such as alkylamine salts and quaternary ammonium salts. In addition, it is also acceptable to use an organic fluoro compound instead of the known surfactant. The organic fluoro compound is preferably hydrophobic. Examples of the organic fluoro compound include fluorine-based surfactants, oily fluorine-based compounds (for example, fluorine oil) and solid fluorine compound resins (for example, ethylene tetrafluoride resin), and also include those described in JP-B No. 57-9053 (columns 8 to 17) and JP-A No. 62-135826.

(Colorant)

The ink composition of the invention may contain a colorant according to the purpose. The ink composition of the invention may be made into an ink composition which is capable of forming visible images, by adding a colorant.

The colorant that may be used in the ink composition of the invention is not particularly limited, and various known coloring materials (pigments and dyes) may be appropriately selected and used in accordance with the application. For example, when it is intended to form an image having excellent weather resistance, a pigment is preferred. As for dyes, water-soluble dyes and oil-soluble dyes may all be used, but oil-soluble dyes are preferred.

(Pigment)

First, pigments which may be preferably used as a colorant in the ink composition of the invention will be described. When a pigment is used as the colorant, the colored image formed using the ink composition acquires excellent light fastness.

The pigment is not particularly limited, and generally, use may be made of all those commercially available organic pigments and inorganic pigments, pigments dispersed in insoluble resins as dispersion media, pigments having resins grafted to the pigment surface, and the like. Furthermore, resin particles dyed with a dye, and the like may also be used.

Examples of these pigments include the pigments described in "Dictionary of Pigments" (published in 2000) edited by Ito, Seishiro; "Industrial Organic Pigments" by W. Herbst and K. Hunger; JP-A Nos. 2002-12607, 2002-188025, 2003-26978 and 2003-342503.

Specific examples of the organic pigments and inorganic pigments that may be used in the invention include the compounds described in paragraphs [0126] to [0131] of JP-A No. 2008-13646, and these compounds may also be applied to the invention.

Dispersion of the pigment may be carried out using dispersing apparatuses such as, for example, a ball mill, a sand mill, an attriter, a roll mill, a jet mill, a homogenizer, a paint shaker, a kneader, an agitator, a Henschel mixer, a colloid mill, an ultrasonic homogenizer, a pearl mill, and a wet jet mill.

Upon conducting dispersing of the pigment, a dispersant may be added to the composition. Examples of the dispersant include a hydroxyl group-containing carboxylic acid ester, a salt of a long-chain polyaminoamide and a high molecular weight acid ester, a salt of a high molecular weight polycarboxylic acid, a high molecular weight unsaturated acid ester, a macromolecular copolymer, a modified polyacrylate, an aliphatic polyvalent carboxylic acid, a naphthalenesulfonic acid-formalin condensate, a polyoxyethylene alkyl phosphate ester, a pigment derivative, and the like. It is also preferable to use commercially available macromolecular dispersants such as the SOLSPERSE series (trade name) manufactured by Lubrizol Corp.

Furthermore, synergists that are available in accordance with various pigments may also be used as auxiliary dispersants. These dispersants and auxiliary dispersants are preferably added in an amount of 1 to 50 parts by weight, relative to 100 parts by weight of the pigment.

In regard to the ink composition, a solvent may be added as a dispersion medium for various components such as the pigment, or a polymerizable compound, which is a low molecular weight component, may also be used as the dispersion medium in a solventless state. However, since the ink composition of the invention is a radiation-curable type ink, and since the ink is cured after being applied onto a recording medium, it is preferable that the ink composition be solventless. This is because, when the solvent remains behind in a cured ink image, solvent resistance may be deteriorated or there occurs a problem of VOC (Volatile Organic Compound) concerning the remaining solvent. From this point of view, it is preferable to use a polymerizable compound as the dispersion medium, and to select a cationic polymerizable monomer having the lowest viscosity among others, from the viewpoint of enhancing the dispersion adaptability or the handlability of the ink composition.

The volume average particle size of the pigment particles in the ink composition is preferably from 0.02 µm to 0.60 µm, and more preferably from 0.02 µm to 0.10 µm. The maximum particle size is preferably 3 µm or less, and more preferably 1 µm or less, and the selection of pigment, dispersant and dispersion medium, the conditions for dispersing and the conditions for filtering are established so as to adjust the particle size to the range. As a result of this management of particle size, clogging of head nozzles may be suppressed, and storage stability of the ink, ink transparency and curing sensitivity may be maintained.

(Dye)

Next, dyes which may be preferably used as a colorant according to the invention will be described.

The dye may be appropriately selected from the conventionally known compounds (dyes) and used. Specific examples include the compounds described in paragraphs [0023] to [0089] of JP-A No. 2002-114930 and paragraphs [0136] to [0140] of JP-A No. 2008-13646; and the like, and these may also be applied to the invention.

The colorant is added to the ink composition in an amount of preferably 0.05 to 20% by weight, and more preferably 0.2 to 10% by weight, relative to the total weight of the ink composition. When an oil-soluble dye is used as the colorant, it is particularly preferable to use the dye in an amount of 0.2 to 6% by weight, relative to the total weight of the ink composition (including the solvent).

(Additives)

In the ink composition of the invention, various additives may be used in combination according to the purposes, in addition to the various essential components. These optional components will be explained.

-Ultraviolet Absorbent-

The ink composition of the invention may be added with an ultraviolet absorbent, from the viewpoint of enhancing the weather resistance of the obtainable cured product or image, and preventing discoloration.

Examples of the ultraviolet absorbent include the benzotriazole-based compounds described in JP-A Nos. 58-185677, 61-190537, 2-782, 5-197075, 9-34057 and the like; the benzophenone-based compounds described in JP-A Nos. 46-2784 and 5-194483, U.S. Pat. No. 3,214,463, and the like; the cinnamic acid-based compounds described in JP-B Nos. 48-30492 and 56-21141, JP-A No. 10-88106, and the like; the triazine-based compounds described in JP-A Nos. 4-298503, 8-53427, 8-239368, 10-182621, Japanese Patent Application National Publication (Laid-Open) No. 8-501291, and the like; the compounds described in Research Disclosure No. 24239; and compounds which absorb ultraviolet radiation and emit fluorescence, as represented by stilbene-based and benzoxazole-based compounds, that is, so-called fluorescent whitening agents.

The amount of addition of the ultraviolet absorbent may be appropriately selected according to the purpose, but in general, the amount is about from 0.01 to 10% by weight relative to the total amount (total weight) of the ink composition.

-Antioxidant-

The ink composition of the invention may be added with an antioxidant, for the purpose of stability enhancement. Examples of the antioxidant include the agents described in European Patent Application Nos. 223739, 309401, 309402, 310551, 310552 and 459-416; German Patent Application No. 3435443; JP-A Nos. 54-48535, 62-262047, 63-113536, 63-163351, 2-262654, 2-71262, 3-121449, 5-61166 and 5-119449; U.S. Pat. Nos. 4,814,262 and 4,980,275; and the like.

The amount of addition of the antioxidant may be appropriately selected according to the purpose, but in general, the amount is about from 0.01 to 10% by weight relative to the total amount (total weight) of the ink composition.

-Discoloration Preventing Agent-

In the ink composition of the invention, various organic and metal complex-based discoloration preventing agents may be used. Examples of the organic discoloration preventing agents include hydroquinones, alkoxyphenols, dialkoxyphenols, phenols, anilines, amines, indanes, chromanes, alkoxyanilines, heterocycles and the like. Examples of the metal complex-based discoloration preventing agents include nickel complexes, zinc complexes and the like, and specific examples that may be used include the compounds described in Research Disclosure No. 17643 under items VII-I to VII-J; No. 15162; No. 18716, p. 650, left column; No. 36544, p. 527; No. 307105, p. 872; and the patent documents cited in No. 15162, or the compounds included in the formula and compound examples of the representative compounds described in JP-A No. 62-215272, pp. 127-137.

The amount of addition may be appropriately selected according to the purpose, but in general, the amount is about from 0.01 to 10% by weight, relative to the total amount (total weight) of the ink composition.

-Electroconductive Salts-

When the ink composition of the invention is used in an ink composition for inkjet recording, electroconductive salts such as potassium thiocyanate, lithium nitrate, ammonium thiocyanate and dimethylamine hydrochloride, may be added to the composition for the purpose of controlling the ejection properties.

-Solvent-

It is also effective to add a trace amount of an organic solvent to the ink composition of the invention, in order to improve the adhesiveness between the solid surface of a recording medium or the like, and the cured product or formed image.

Examples of the solvent include ketone-based solvents such as acetone, methyl ethyl ketone and diethyl ketone; alcohol-based solvents such as methanol, ethanol, 2-propanol, 1-propanol, 1-butanol and tert-butanol; chlorine-based solvents such as chloroform and methylene chloride; aromatic solvents such as benzene and toluene; ester-based solvents such as ethyl acetate, butyl acetate and isopropyl acetate; ether-based solvents such as diethyl ether, tetrahydrofuran and dioxane; glycol ether-based solvents such as ethylene glycol monomethyl ether and ethylene glycol dimethyl ether; and the like.

In this case, an addition to the extent that deterioration of solvent resistance does not occur is effective, and the amount is preferably in the range of 0.1 to 5% by weight, and more preferably 0.1 to 3% by weight, relative to the total weight of the ink composition.

-Macromolecular Compound-

The ink composition of the invention may be added with various macromolecular compounds, for the purpose of regulating the film properties. Examples of the macromolecular compounds that may be used include an acrylic polymer, a polyvinyl butyral resin, a polyurethane resin, a polyamide resin, a polyester resin, an epoxy resin, a phenolic resin, a polycarbonate resin, a polyvinyl butyral resin, a polyvinyl formal resin, shellac, a vinyl-based resin, an acrylic resin, a rubber-based resin, a wax, other natural resins, and the like. These may be satisfactorily used in combination of two or more kinds Among these, a vinyl-based copolymer obtainable by copolymerization of acrylic monomers is preferred. Furthermore, a copolymer including "a carboxyl group-containing monomer," "a methacrylic acid alkyl ester" or "an acrylic acid alkyl ester" as structural units may also be preferably used for the copolymer composition of the macromolecular binding material.

In addition to these, the ink composition of the invention may be incorporated with, for example, a leveling additive, a matting agent, a wax for regulating film properties, a tackifier which does not inhibit polymerization and is intended to improve the adhesiveness to a recording medium such as polyolefin or PET, and the like according to necessity.

Specific examples of the tackifier include the high molecular weight adhesive polymers described in JP-A No. 2001-49200, pp. 5-6 (for example, a copolymer formed from an ester of (meth)acrylic acid and an alcohol having an alkyl group having 1 to 20 carbon atoms, an ester of (meth)acrylic acid and an alicyclic alcohol having 3 to 14 carbon atoms, and an ester of (meth)acrylic acid and an aromatic alcohol having 6 to 14 carbon atoms); low molecular weight tackifying resins having polymerizable unsaturated bonds; and the like.

<Preferable Properties of Ink Composition>

It is as previously described that since the ink composition of the invention cures with high sensitivity and is excellent in the strength and flexibility of the cured product, it is preferable to apply the ink composition to an active energy ray-curable ink composition. However, it is particularly preferable to use the ink composition in an ink composition that is applied to inkjet recording methods.

When the ink composition of the invention is applied to inkjet recording, the ink viscosity at the temperature upon jetting is preferably from 5 mPa·s to 30 mPa·s, and more preferably from 7 mPa·s to 20 mPa·s, in consideration of jettability. Therefore, it is preferable to determine the viscosity by appropriately adjusting the composition ratio so as to acquire the viscosity in the range mentioned above.

The viscosity of the ink composition at room temperature (25 to 30° C.) is preferably from 7 mPa·s to 120 mPa·s, and more preferably from 10 mPa·s to 80 mPa·s. When the viscosity at room temperature is set high, even if a porous recording medium is used, ink penetration into the recording medium may be prevented, and reduction of uncured monomer and reduction of foul odor are made possible. Furthermore, dot bleeding at the time of landing of ink droplets may be suppressed, and as a result, image quality may be improved.

The surface tension of the ink composition of the invention is preferably from 20 mN/m to 40 mN/m, and more preferably from 20 mN/m to 30 mN/m. When recording is performed using the ink composition of the invention on various recording media such as polyolefin, PET, coated paper and non-coated paper, the surface tension is preferably 20 mN/m or more from the viewpoint of bleeding and penetration, and the surface tension is preferably 30 mN/m or less from the viewpoint of wettability.

The ink composition of the invention may be suitably used as an ink for inkjet recording. The inkjet recording system is not particularly limited, and the inkjet recording system may be, for example, any of a charge control system which jets out ink using electrostatic attractive force; a drop-on-demand system (pressure pulse system) which uses the vibration pressure of a piezoelectric element; an acoustic type inkjet system which converts an electric signal into an acoustic beam, irradiates an ink with the acoustic beam, and jets out the ink utilizing a radiation pressure; a thermal type inkjet system which forms air bubbles by heating an ink, and utilizes the pressure generated therefrom; and the like. Furthermore, the inkjet recording system also includes a system that ejects an ink having a low concentration, called a photo ink, in the form of a large number of small-volume droplets; a system that improves the image quality using plural inks that have substantially the same color but different concentrations; or a system that makes use of a colorless transparent ink.

Among the systems described above, the ink composition of the invention is suitable as an ink for inkjet recording based on the drop-on-demand system (pressure pulse system) that makes use of a piezoelectric element.

<Inkjet Recording Method>

The ink composition of the invention may be used in an inkjet recording method including (a) a process of jetting the ink composition on a recording medium (image recording process), and (b) a process of curing the ink composition by irradiating the jetted ink composition with active energy rays (image curing process).

That is, the inkjet recording method of the invention is a method including an image recording process of forming an image by inkjet recording, and an image curing process.

In regard to the image curing process according to the invention, when active energy rays are utilized in the image curing process, and an image is recorded on a recording medium in the image recording process, followed by irradiation of the recorded image with active energy rays, then polymerization and curing of the polymerizable compound that contributes to image formation, start to proceed. Thus, a highly robust image that is satisfactorily cured may be formed.

In the mage curing process, there may be carried out an exposure treatment of accelerating polymerization and curing using a light source that emits an active energy ray having a wavelength in the region corresponding to the induction wavelength possessed by the ink composition. The light source, exposure time and amount of light may be appropriately selected in accordance with the degree of polymerization and curing of the polymerizable compound related to the invention.

The thickness of the image cured in the image curing process is preferably from 2 μm to 30 μm. Here, the "thickness of image" refers to the thickness of the cured product obtained by curing an image formed using an ink composition. When the thickness of the image is from 2 μm to 30 μm, images from low density to high density may be freely expressed.

In the image curing process, there may be carried out an exposure treatment of accelerating polymerization and curing using a light source that emits an active energy ray having a wavelength in the region corresponding to the induction wavelength possessed by the ink composition. Specifically, the exposure treatment may be suitably carried out using a light source that emits active radiation having a wavelength in the region of 250 nm to 450 nm, and preferably 365±20 nm, such as, for example, a laser diode (LD), a light emitting diode (LED), a fluorescent lamp, a low pressure mercury lamp, a high pressure mercury lamp, a metal halide lamp, a carbon arc lamp, a xenon lamp, or a chemical lamp. Preferred examples of the light source include an LED, a high pressure mercury lamp, and a metal halide lamp, and among them, it is preferable to use an LED as the light source for the curing of the cationic polymerizable composition of the invention.

When curing is achieved by radical polymerization, since the polymerization reaction is inhibited by oxygen, curing may be achieved with less energy by performing the exposure in a state of low oxygen concentration, that is, under an atmosphere of nitrogen gas or the like.

A recorded matter obtained by using this ink is such that the image areas have been cured by irradiation with a radiation such as ultraviolet radiation, and thus the strength of the image areas is excellent. Therefore, the recorded matter may also be used as, for example, an ink receiving layer (image area) of a planographic printing plate.

In regard to the recording process, it is preferable to apply an inkjet recording method using an inkjet printer. Specifically, it is preferable for the image recording process that images be recorded by an inkjet recording technique of jetting the ink composition described above.

<Inkjet Recording Method and Inkjet Recording Apparatus>

Next, an inkjet recording method that may be suitably employed in the method of the invention, and an inkjet recording apparatus will be explained below.

System

An exemplary form of the inkjet recording system that jets out ink may be represented by a system disclosed in JP-A No. 2002-11860, but the system is not limited to this form and may adopt other forms as well.

Ink Retaining Unit

In regard to a unit that retains ink, it is preferable to fill in the ink in a known ink cartridge, or the ink retaining unit may be contained in a deformable container to form a tank, as disclosed in JP-A No. 5-16377. Furthermore, as disclosed in JP-A No. 5-16382, if the unit is equipped with a subtank, supply of ink to a head will be more stabilized. As disclosed in JP-A No. 8-174860, a cartridge in the form of supplying ink based on the movement of a valve when the pressure in the ink supply chamber is decreased, may also be used. Suitable methods for applying a negative pressure in order to appropriately maintain the meniscus in the head in such an ink retaining unit, include a method based on the height of the ink retaining unit, that is, the hydraulic head pressure; a method based on the capillary force of a filter provided in the ink flow channel; a method of controlling the pressure using a pump or the like; a method of maintaining the ink in an ink absorber and applying a negative pressure by means of its capillary force, as disclosed in JP-A No. 50-74341; and the like.

Ink Supply Channel

Methods for supplying ink from such an ink retaining unit to a head may include a method of directly connecting the retaining unit to a head unit, or a method of connecting the retaining unit to a head unit via a flow channel such as a tube. These ink retaining units and flow channels are preferably formed from a material such as a material having satisfactory wettability with ink, or a material that has been subjected to a surface treatment.

Head

Methods of ejecting ink droplets may include a method of continuously jetting ink droplets and controlling to select whether to land the droplets obliquely on a material to be recorded in accordance with the image, as disclosed in JP-A No. 5-104725; or a method of jetting ink droplets only to those necessary portions in an image, so called as an on-demand system. The on-demand system may be a system of jetting the ink by generating an ink pressure through deformation of a structure using a piezoelectric element or the like, as disclosed in JP-A No. 5-16349, or may be a system of jetting the ink under a pressure that is generated by expansion as a result of vaporization due to thermal energy, as disclosed in JP-A No. 1-234255. Furthermore, as disclosed in JP-A No. 2001-277466, the system may also be a system of controlling the jetting to a material to be recorded under the action of an electric field.

In regard to the inkjet recording method, image recording is performed on a recording medium using the ink composition of the invention. The ink jetting nozzle or the like used at that time is not particularly limited, and may be appropriately selected according to the purpose. A nozzle in the form such as described in, for example, JP-A No. 5-31908 is applicable. In this case, when nozzles are configured in plural rows as described in JP-A No. 2002-316420 in order to jet out inks of plural colors, color images may be formed at high speed. Furthermore, if plural head units each having plural nozzle rows are arranged, a further increase in the speed may be achieved.

When nozzles are arranged at a width interval equal to or greater than the width of the image, to thereby form a so-called line head, and a material to be recorded is moved concurrently with the droplet ejection from these nozzles, as described in JP-A No. 63-160849, formation of images at high speed is made possible.

If a surface treatment such as that disclosed in JP-A No. 5-116327 is applied to the surfaces of nozzles, adhesion of airborne ink droplets to the nozzle surfaces and adhesion of ink droplets may be prevented.

Even if such a treatment is applied, dirt may still adhere in some cases, and for this reason, it is preferable to perform cleaning using a blade as disclosed in JP-A No. 6-71904.

It may not be true that inks of various colors are always equally ejected from the nozzles, and in some cases, some particular inks may not be jetted out for a long time. In such an instance, in order to maintain the meniscus stable, it is preferable to maintain the ink properties at adequate values by appropriately jetting the ink to areas outside the image area, and replenishing new ink to the head as disclosed in JP-A No 11-157102.

Even if such measures are taken, air bubbles may penetrate into the head or may be generated in the head. In this case, as described in JP-A No. 11-334092, if ink is forcibly sucked in from the outside of the head, ink with changed properties may be discarded, and at the same time, the air bubbles may be discharged out of the head. Furthermore, if ink droplet ejection is not intended for a long time, the nozzle surface may be protected by covering the nozzle surface with a cap, as described in JP-A No. 11-138830. In some cases, jetting may still not occur even if these measures are taken.

If an image is printed while some of the nozzles are incapable of jetting, there arises a problem that unevenness occurs in the image. In order to avoid such situation, it is effective to detect any nozzle that is incapable of jetting, and to take measures, as disclosed in JP-A No. 2000-343686.

When overlapped droplet ejection is carried out by mechanically moving the head unit, and synchronously moving the material to be recorded intermittently in a perpendicular direction as described in JP-A No. 6-115099, it is effective in making hardly visible of the unevenness resulting from accuracy defect in the intermittent movement of the material to be recorded, and high image quality may be realized. In this case, the relationship between image quality and the recording speed may be established into a preferable relationship, by appropriately balancing the relationship between the speed of head movement, the extent of movement of the material to be recorded, and the number of nozzles.

Furthermore, on the contrary, when the head is fixed, and the material to be recorded is mechanically made to move in a shuttling manner in a predetermined direction and at the same time, is made to move intermittently in a direction perpendicular to the predetermined direction, a similar effect may be obtained.

Temperature Control

It is preferable that the inkjet recording apparatus be equipped with a unit that stabilizes the temperature of the ink composition, and the region of the apparatus to be maintained at a constant temperature includes all members in the piping system covering from the ink tank (including an intermediate tank, if present) to the nozzle ejection surface.

In regard to the inkjet recording method, it is preferable to heat the ink composition to 40° C. to 80° C. to decrease the viscosity of the ink composition down to 30 mPa·s or less, and preferably 20 mPa·s or less, and then to perform ejection. High ejection stability may be realized by using this method. In general, since radiation-curable ink compositions commonly have higher viscosities than those of aqueous inks, the range of fluctuation in the viscosity due to the fluctuation in temperature at the time of printing is large. Since this viscosity fluctuation of the ink composition directly exerts a large influence on the size of liquid droplets and the rate of liquid droplet ejection, and thereby causes deterioration in the image quality, it is required to maintain the temperature of the ink composition at the time of printing as constant as possible. Therefore, it is preferable to provide the inkjet recording apparatus with an ink temperature detecting unit, an ink heating unit, and a control unit that controls heating in accordance with the detected ink temperature.

The method of controlling the temperature is not particularly limited, but it is preferable to control heating in accordance with the flow rate of the ink composition and the temperature of the environment, for example, by providing plural temperature sensors at various piping sites. Furthermore, the head unit to be heated is preferably thermally shielded or insulated, so that the apparatus body is not under the influence of the temperature of air in the outside. In order to shorten the warm-up time for the printer that is required in heating, or to reduce a loss in thermal energy, it is preferable to carry out insulation from other sites, and also to decrease the overall heat capacity of the heating unit.

Alternatively, it is also suitable to have a unit that controls the energy applied to the unit for jetting ink in accordance with the ink temperature.

The control range of the ink composition temperature is preferably adjusted to the set temperature±5° C., more preferably to the set temperature±2° C., and even more preferably to the set temperature±1° C.

Exposure

In regard to the light source, as described previously, a commonly used mercury lamp, metal halide lamp or the like may be used, and a light emitting diode, a semiconductor laser, a fluorescent lamp and the like may be used. Light sources, electromagnetic waves and the like, which induce the polymerization reaction of the ink, such as a hot cathode tube, a cold cathode tube, an electron beam and X-rays, may also be used.

When a metal halide lamp is used, a lamp having an output power of 10 W/cm to 1000 W/cm is used, and a metal halide lamp having an illuminance of 1 mW/cm$^2$ to 100 W/cm$^2$ at the surface of a recording medium is preferred.

When a high pressure mercury lamp, a metal halide lamp or the like is used, it is preferable to provide the inkjet recording apparatus with an exhaust unit, because ozone is generated along with electric discharge. It is suitable to have the exhaust unit disposed such that the unit also combines the function of recovering ink mist that is generated at the time of jetting of ink.

Next, preferable conditions for the irradiation with active energy rays will be described. The basic method of irradiation is disclosed in JP-A No. 60-132767. Specifically, light sources are provided on both sides of the head unit, and the head and the light source are scanned in a shuttling manner. Irradiation is carried out after the landing of the ink, after taking some time. Furthermore, curing is completed by a separate light source that does not necessitate driving. WO 99/54415 discloses a method of using an optical fiber, or a method of irradiating a recorded area with UV light by making a collimated light source incident to a mirror surface that is provided at a lateral side of the head unit, as the method of irradiation. These irradiation methods may be sufficiently used in this invention.

When an ink jetting nozzle is irradiated with an active energy ray for curing, the ink mist or the like adhering to the nozzle surface is solidified, and may pose an obstacle to ink jetting. Thus, it is preferable to take measures such as light shielding, in order to minimize irradiation of nozzles. Specifically, it is suitable to provide a barrier that prevents irradiation of the nozzle plate, or to provide a unit for limiting the incident angle to the material to be recorded so as to reduce stray light.

According to the invention, it is preferable to adjust the time taken from droplet landing to irradiation to be from 0.01 seconds to 0.5 seconds, and it is preferable to irradiate the ink composition with a radiation after from 0.01 seconds to 0.3 seconds, and more preferably from 0.01 seconds to 0.15 seconds. As such, when the time taken from droplet landing to irradiation is controlled to be extremely short, preventing the landed ink droplets from bleeding before curing may be achieved. Also, even for a porous recording medium, since the medium can be exposed before the ink composition penetrates down to the core part where the light source does not reach, unreacted monomers are inhibited from remaining behind, and consequently, an odor originating therefrom may be reduced. When the inkjet recording method described above and the ink composition of the invention are used in combination, a great synergistic effect may be obtained. When such a recording method is adopted, the dot diameter of landed ink droplets may be maintained constant even on various recording media that differ in the surface wettability, and thus the image quality is enhanced.

System Parameters

Upon forming an image, the ink landing diameter on a material to be recorded is suitably between 10 and 500 μm, and for this reason, the diameter of ink droplets at the time of jetting is preferably from 5 to 250 μm, while the nozzle diameter is preferably from 15 to 100 μm.

Upon the formation of an image, the number of pixels per inch is preferably from 50 to 2400 dpi, and therefore, the nozzle density in the head is preferably from 10 to 2400 dpi. Here, even if the nozzle density in the head is low, when the nozzles are tilted against the direction of conveyance of the material to be recorded, or when plural head units are arranged to be shifted from each other, landing at a high density may be realized using a head with large nozzle intervals. Furthermore, high density image recording may be realized by conveying the material to be recorded to a predetermined extent whenever the head moves at a low nozzle pitch as a result of the shuttling movement of the head or material to be recorded as described above, and thus landing ink droplets at different positions.

The amount of ink droplet ejection to a recording medium may be suitably controlled to be any amount between 0.05 $g/m^2$ and 25 $g/m^2$, so as to express a satisfactory gradation, and it is preferable to control the size of the ink droplets jetted from the head, and/or the quantity thereof, in order to realize this amount.

In regard to the distance between the head and the material to be recorded, if the distance is too broad, air flows out concomitantly with the movement of the head or the material to be recorded, and the flight of the ink droplets is disrupted, so that the accuracy on the position of landing is decreased. On the other hand, if the distance is too narrow, there is a risk that the head and the material to be recorded are brought to contact because of the surface unevenness of the material to be recorded, vibration caused by the conveyance mechanism, or the like. Thus, the distance is preferably maintained at about 0.5 mm to 2 mm.

Ink Set

The ink may be of a single color, or may be of cyan, magenta and yellow colors. The ink may be a set of four colors including black, or inks of specific colors other than these colors, which are called special colors, may also be used. The coloring material may be a dye or a pigment. In regard to the order of droplet ejection of these inks, the droplet ejection may be carried out such that the inks are made to land in an order of increasing brightness, or may be carried out such that the inks are made to land in an order of decreasing brightness. Thus, it is preferable to carry out the droplet ejection in a suitable order in terms of the image recording quality.

If the inks are superimposed in order from a color of the highest brightness, it is easy for the active energy ray to reach to the ink in the lower part, while inhibition of the curing sensitivity, an increase in the residual monomers, generation of foul odor, and deterioration of adhesiveness hardly occur. In regard to the irradiation, all of the colors may be ejected and collectively exposed, but it is preferable from the viewpoint of curing acceleration, to expose each color separately.

In regard to the image signals to be recorded, it is preferable to subject the signals to signal processing so as to obtain satisfactory color reproducibility, as described in JP-A No. 6-210905 for example.

The embodiment of use of the ink composition of the invention is not limited to the inkjet recording method described above, and may also be applied to, for example, an instance of forming an ink image on a recording medium by a method other than inkjet recording in the image recording process, and combining this with the image curing process for irradiating the ink mage with active energy rays; an instance of jetting the ink composition on a recording medium by an inkjet recording apparatus, and then heating the ink composition to cure the image; or the like.

The ink composition of the invention may also be used in three-dimensional modeling applications, for example, in the applications of forming a printing ink receiving section in a planographic printing plate as previously mentioned, in addition to the inkjet recording applications, and the ink composition may also be used for canister printing applications or food product applications. In these applications, images may be formed using known methods, and reference may be made to, for example, the descriptions of Japanese Patent No. 2679586 and the like.

[Material to be Recorded]

As for the recording medium on which recording is performed using the ink composition of the invention, ink-permeable recording media and non-ink-permeable recording media may be used together. Examples of the ink-permeable recording media include ordinary papers, papers exclusive for inkjet use, coated papers, papers for general and electrophotographic use, fabrics, unwoven fabrics, porous films, macromolecular absorbers, and the like. These are described as "materials to be recorded" in JP-A No. 2001-1891549 and the like.

Example of the non-ink-permeable recording media include art papers, synthetic resins, rubbers, resin-coated papers, glass, metals, porcelain, wood, and the like. In addition, use may also be made of base materials prepared by combining a number of these materials and processing into complex materials to add the respective functions.

Any synthetic resin may be used as the synthetic resin used as a non-ink-permeable recording medium, but for example, polyesters such as polyethylene terephthalate and polybutadiene terephthalate; polyolefins such as polyvinyl chloride, polystyrene, polyethylene, polyurethane and polypropylene; and acrylic resins, polycarbonates, acrylonitrile-butadiene-styrene copolymers, diacetates, triacetates, polyimides, cellophane, celluloids, and the like may be mentioned.

The shape (thickness) of the base material utilizing a synthetic resin may have a film shape, a card shape or a block shape, and may be appropriately selected according to the desired purpose without particularly limitation. These synthetic resins may be transparent or may be opaque. In regard to the form of use of the recording medium utilizing a synthetic resin, the synthetic resin may be used in the form of the film that is used in so-called soft packaging according to a preferred embodiment, and various non-absorptive plastics and films thereof may be used. Examples of the films formed from various plastics include polyethylene terephthalate (PET) films, biaxially stretched polystyrene (OPS) films, biaxially stretched polypropylene (OPP) films, biaxially stretched nylon (ONy) films, polyvinyl chloride (PVC) films, polyethylene (PE) films, and triacetylcellulose (TAC) films.

Examples of the resin-coated paper used as a non-ink-permeable recording medium, include transparent polyester films, opaque polyester films, opaque polyolefin resin films, and paper supports laminated on both surfaces with polyolefin resins. The paper supports laminated on both surfaces with polyolefin resins are particularly preferred.

As discussed above, according to the image recording method using the ink composition of the invention, images excellent in strength and flexibility, as well as in the adhesiveness to recording media may be obtained. Furthermore, the obtained recorded matters have excellent adhesiveness, and do not cause a problem related to brittleness.

In addition to the use in ink compositions, the curable composition of the invention is also applicable to the fields of coating, adhesive agents, rapid prototyping, photoresist for semiconductor and the like.

Exemplary embodiments of the invention will be listed in the following.

<1> An ink composition comprising: a polymer having a polyoxyalkylene group and a partial structure selected from the group consisting of a fluoroalkyl group, a siloxane skeleton and a long-chain alkyl group; a polymerizable compound; and a polymerization initiator.

<2> The ink composition according to <1>, wherein the polymer includes a structural unit represented by the following formula (1):

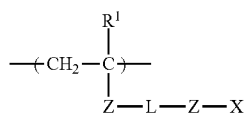 (1)

herein $R^1$ represents a hydrogen atom or a methyl group; Z's each independently represent a divalent organic group; L represents a polyoxyalkylene group; and X represents a group selected from the group consisting of a fluoroalkyl group, a siloxane skeleton and a long-chain alkyl group.

<3> The ink composition according to <1> or <2>, wherein the polymer further comprises a polymerizable functional group.

<4> The ink composition according to any one of <1> to <3>, wherein the polymerizable compound is a radical polymerizable compound.

<5> The ink composition according to any one of <1> to <3>, wherein the polymerizable compound is a cationically polymerizable compound.

<6> The ink composition according to any one of <1> to <5>, wherein the polymerizable compound comprises a monofunctional polymerizable compound, and the amount of the monofunctional polymerizable compound is in the range of 80 to 100 parts by weight, when the total amount of the polymerizable compound is taken as 100 parts by weight.

<7> An inkjet recording method, the method comprising jetting the ink composition of claim 1 on a recording medium, and curing the ink composition by irradiating the jetted ink composition with active radiation.

<8> A printed article printed using the ink composition according to any one of <1> to <6>.

EXAMPLES

Hereinafter, the present invention will be described by way of Examples, but the invention is not intended to be limited to these Examples.

Unless particularly stated otherwise, "parts" indicate "parts by weight".

[Synthesis of Polymer D-1]

Components of the following constitution were introduced into a 500-ml flask, and the components were allowed to react for 10 hours at 70° C.

(Constitution)

| | |
|---|---:|
| Solvent: Methyl ethyl ketone | 50 parts |
| Monomer-1: Polyethylene glycol monoacrylate (n = 10) (trade name: BLENMER AE400, manufactured by NOF Corp.) | 15.8 parts |
| Monomer-2: 2-(2-Bromoisobutyryloxy)ethyl methacrylate (trade name: BBEM, manufactured by MANAC, Inc.) | 5.6 parts |
| Polymerization initiator: Dimethyl 2,2'-azobis(2-methylpropionate) (trade name: V-601, manufactured by Wako Pure Chemical Industries, Ltd.) | 0.17 parts |

Subsequently, 6 parts of 1,8-diazabicyclo[5.4.0]undec-7-ene (trade name: DBU, manufactured by Wako Pure Chemical Industries, Ltd.) was added to the flask, and the mixture was allowed to react for 24 hours at room temperature. Then, the reaction mixture was neutralized with methanesulfonic acid, and precipitates were separated by filtration. Subsequently, the solution (filtrate) was cooled to 0° C. in an ice bath, and 12.3 parts of heptafluoropropionic anhydride as a modifier for site of segregation, was added dropwise to the solution. The mixture was slowly returned to room temperature, and then was allowed to react for 3 hours at room temperature.

The reaction solution was poured into 300 ml of water, and was dissolved in tetrahydrofuran. Purification by re-immersion in water was performed three times, and thus 20 parts of the desired polymer D-1 was obtained.

[Synthesis of Polymers D-2 to D-12]

Polymers D-2 to D-12 (structures shown below) were synthesized in the same manner as in the synthesis of the polymer D-1, except that the monomer and the modifier for site of segregation used in the synthesis of the polymer D-1 were replaced with the compounds indicated in Table 1.

TABLE 1

| Polymer | Monomer 1 | Monomer 2 | Modifier for site of segregation |
|---|---|---|---|
| D-1 | BLENMER AE-400 | BBEM | Heptafluoropropionic anhydride |
| D-2 | BLENMER PE-350 | BBEM | X-22-3710 |
| D-3 | BLENMER AE-200 | BBEM | Octadecanoic acid |
| D-4 | BLENMER PME-1000 | M-1620 | None |
| D-5 | BLENMER AET | FM-0711 | None |
| D-6 | BLENMER AE-90 | Stearyl methacrylate | None |
| D-7 | BLENMER 70PEP-350B | BBEM | Heptafluoropropionic anhydride |
| D-8 | BLENMER 55PET-800 | BBEM | X-22-3710 |
| D-9 | BLENMER AE-400 | Glycidyl methacrylate | Heptafluoropropionic anhydride |
| D-10 | BLENMER PE-350 | Glycidyl methacrylate | X-22-3710 |
| D-11 | BLENMER AE-200 | Glycidyl methacrylate | Octadecanoic acid |
| D-12 | BLENMER AE-400 | None | Heptafluoropropionic anhydride |

The compounds used in the Table 1 are as follows.

BLENMER AE-200: Polyethylene glycol monoacrylate (n=4.5), manufactured by NOF Corp.

BLENMER AET: Poly(ethylene glycol tetramethylene glycol) monoacrylate, manufactured by NOF Corp.

BLENMER AE-90: Polyethylene glycol monoacrylate (n=2), manufactured by NOF Corp.

BLENMER 55PET-800: Poly(ethylene glycol tetramethylene glycol) monomethacrylate, manufactured by NOF Corp.

M-1420: 2-(Perfluorobutyl)ethyl methacrylate, manufactured by Daikin Industries, Ltd.

M-1620: 2-Perfluorohexylethyl methacrylate, manufactured by Daikin Industries, Ltd.

Furthermore, the structures of BLENMER PE-350, BLENMER PME-1000, BLENMER 70PEP-350B, FM-0711 and X-22-3710 are presented in the following.

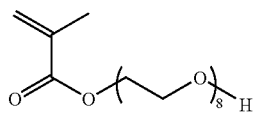
BLENMER PE-350, manufactured by NOF Corp.

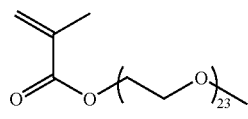
BLENMER PME-1000, manufactured by NOF Corp.

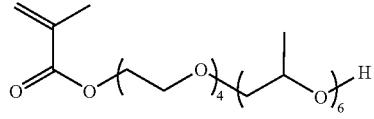
BLENMER 70 PEP-350B, manufactured by NOF Corp.

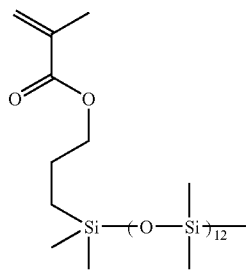
SILAPLANE FM-0711, manufactured by Chisso Corp.

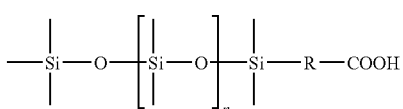
X-22-3710, manufactured by Shin-Etsu Chemical Co., Ltd.

D-1
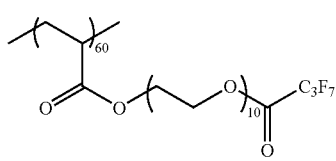 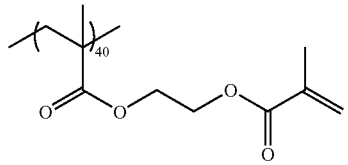
Mw = 40000

D-2
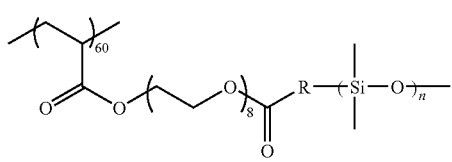 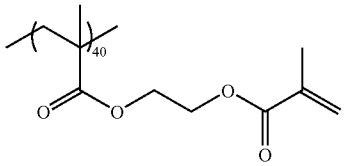
Mw = 38000

D-3
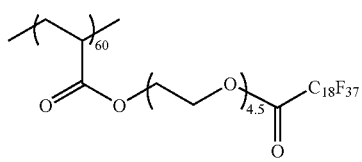 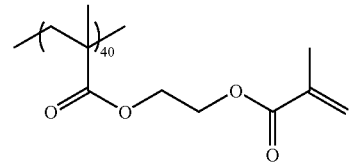
Mw = 32000

D-4
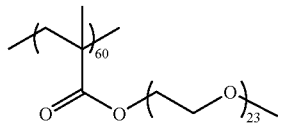 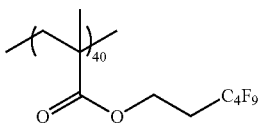
Mw = 12000

-continued
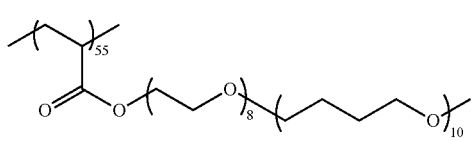 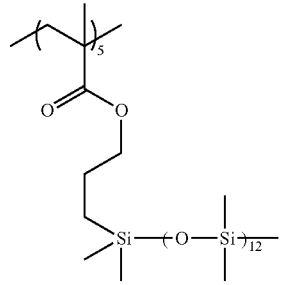
D-5
Mw = 36000
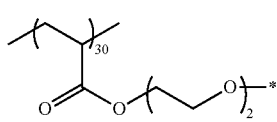 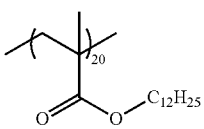
D-6
Mw = 43000
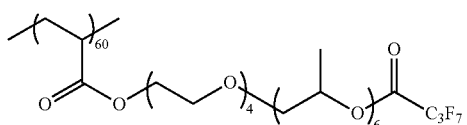 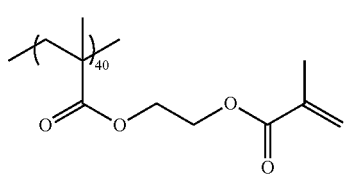
D-7
Mw = 43000
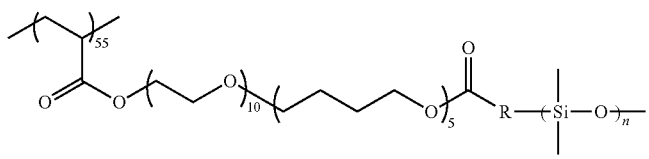 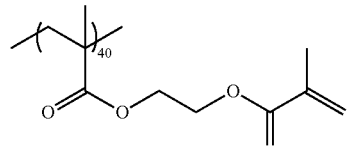
D-8
Mw = 36000
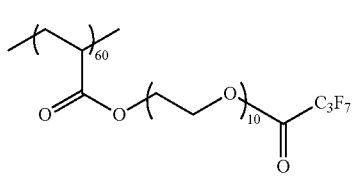 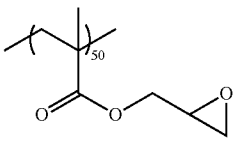
D-9
Mw = 22000
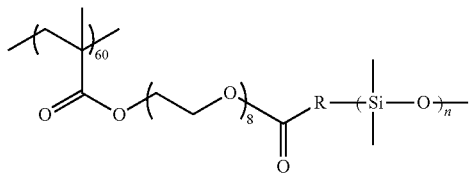 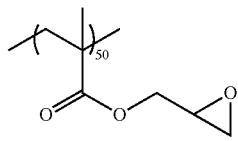
D-10
Mw = 24000
D-11
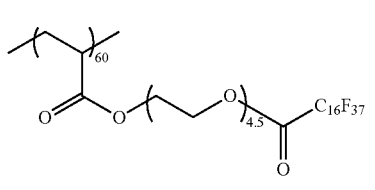 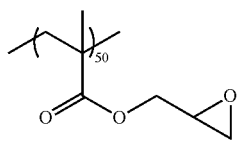
Mw = 25000

D-12

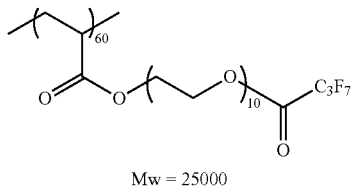

Mw = 25000

Examples 1 to 8, 12 and Comparative Examples 1 to 2

[Preparation of Radical Polymerizable Ink Composition]

A mixture of the components of the following constitution was mixed under stirring for 2 hours, and it was checked whether there was any dissolution residue. The mixture was filtered through a membrane filter to remove coarse particles. Thereby, the respective ink compositions of Examples 1 to 8, 12 and Comparative Examples 1 to 2 were obtained.

Ink constitution (magenta color ink composition)

| | |
|---|---|
| Polymerizable compound: Phenoxyethyl acrylate | 21.0 parts |
| Polymerizable compound: N-vinylcaprolactam | 14.0 parts |
| Polymerizable compound: Dicyclopentenyloxyethyl acrylate (trade name: FA-512A, manufactured by Hitachi Chemical Co., Ltd.) | 17.4 parts |
| Polymer: Polymers D-1 to D-8, D-12 or comparative compound 1 as indicated in the table | 1.0 part |
| Dispersant: SOLSPERSE 36000 (trade name, manufactured by Noveon Co.) | 2.0 parts |
| Magenta pigment: CINQUASIA MAGENTA RT-355D (trade name, pigment manufactured by Ciba Specialty Chemicals Corp.) | 3.6 parts |
| Stabilizer: GENORAD 16 (trade name, manufactured by Rahn AG) | 0.05 parts |
| Polymerizable compound: RAPI-CURE DVE-3 (trade name, triethylene glycol divinyl ether manufactured by ISP Europe, Inc.) | 8.0 parts |
| Photopolymerization initiator: DAROCUR TPO (trade name, manufactured by Ciba Specialty Chemicals Corp.) | 8.5 parts |
| Photopolymerization initiator: IRGACURE 907 (trade name, manufactured by Ciba Specialty Chemicals Corp.) | 4.0 parts |
| BYK 307 (trade name, defoaming agent manufactured by BYK Chemie) | 0.05 parts |

The structures of the comparative compounds 1 and 2 indicated in the Table 2 are presented below.

Comparative compound 1

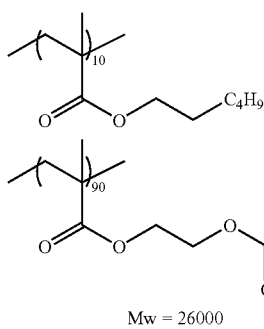

Mw = 26000

Comparative compound 2

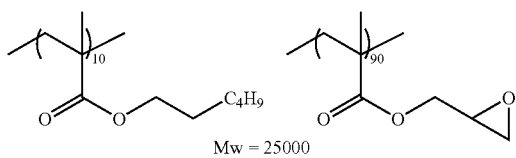

Mw = 25000

Examples 9 to 11, 13 and Comparative Examples 3 to 4

(Preparation of Cationically Polymerizable Composition)

A mixture of the components of the following constitution was mixed under stirring for 2 hours, and it was checked whether there was any dissolution residue. The mixture was filtered through a membrane filter to remove coarse particles. Thereby, the respective ink compositions of Examples 9 to 11, 13 and Comparative Examples 3 to 4 were obtained.

| | |
|---|---|
| Cationically polymerizable compound: CELLOXIDE 2021 (trade name, epoxy compound manufactured by Daicel-UCB Co., Ltd.) | 35 parts |
| Cationically polymerizable compound: OXT-221 (trade name, oxetane compound manufactured by Toagosei Co., Ltd.) | 55 parts |
| Polymer: Polymers D-9 to D-13 or comparative compound 2 indicated in Table 1 | 1.0 part |
| Photoacid generator: UVI-6990 (trade name, manufactured by Union Carbide Corp.) | 10 parts |
| Dispersant: SOLSPERSE 36000 (trade name, manufactured by Noveon Co.) | 2.0 parts |
| Magenta pigment: CINQUASIA MAGENTA RT-355D (trade name, pigment manufactured by Ciba Specialty Chemicals Corp.) | 3.6 parts |
| Sensitizer: 9,10-Dibutoxyanthracene | 0.5 parts |

The ink compositions of Examples 1 to 13 and Comparative Examples 1 to 4 were evaluated by the evaluation method described below. The results are presented in Table 2.

TABLE 2

|  | Polymer | Exposure sensitivity (mJ/cm$^2$) | Blocking sensitivity (mJ/cm$^2$) | Ratio of elongation (%) | Jetting stability | Image smoothness |
| --- | --- | --- | --- | --- | --- | --- |
| Example 1 | D-1 | 1200 | 6000 | 220 | A | A |
| Example 2 | D-2 | 1200 | 6000 | 220 | A | A |
| Example 3 | D-3 | 1200 | 6000 | 220 | A | A |
| Example 4 | D-4 | 1200 | 6000 | 220 | A | A |
| Example 5 | D-5 | 1200 | 6000 | 220 | A | B |
| Example 6 | D-6 | 1200 | 6000 | 220 | A | B |
| Example 7 | D-7 | 1200 | 6000 | 220 | A | B |
| Example 8 | D-8 | 1200 | 6000 | 220 | A | A |
| Example 9 | D-9 | 300 | 1200 | 220 | A | A |
| Example 10 | D-10 | 300 | 1200 | 220 | A | A |
| Example 11 | D-11 | 300 | 1200 | 220 | A | A |
| Example 12 | D-12 | 1200 | 9000 | 220 | A | A |
| Example 13 | D-13 | 300 | 1800 | 220 | A | A |
| Comparative Example 1 | None | 2400 | 20000 | 220 | A | A |
| Comparative Example 2 | Comparative compound 1 | 1200 | 5000 | 220 | A | C |
| Comparative Example 3 | None | 300 | 12000 | 220 | A | A |
| Comparative Example 4 | Comparative compound 2 | 300 | 1200 | 220 | A | C |

(Measurement of Exposure Sensitivity)

The amount of exposure energy (mJ/cm$^2$) at which the sensation of tackiness disappears from a solid image surface obtained by applying the inkjet recording method described above, after irradiation with ultraviolet radiation, was defined as exposure sensitivity. A smaller value indicates higher sensitivity.

An acceptable range of the exposure sensitivity is 2000 mJ/cm$^2$ or less, and the range is more preferably 1500 mJ/cm$^2$ or less.

(Evaluation of Blocking Sensitivity)

On an image obtained by applying the inkjet recording method described above and irradiated with ultraviolet radiation, 500 sheets of PET (size: same size both horizontally and vertically as that of a soft vinyl chloride sheet with an image formed thereon, weight: 2 g/sheet) were stacked in a pile and were left to stand for one day. The transfer of ink to the PET sheets was evaluated by visual inspection. The amount of exposure energy (mJ/cm$^2$) required until no more transfer occurred, was defined as blocking sensitivity.

The acceptable range of the blocking sensitivity is 12,000 mJ/cm$^2$ or less, and the range is more preferably 6,000 mJ/cm$^2$ or less.

(Evaluation of Ratio of Elongation)

A cured film was produced in the same manner as in the evaluation of exposure sensitivity, except that the cumulative amount of exposure was set at 12,000 mJ/cm$^2$, the illuminance was set at 2140 mW/cm$^2$, and FASSON PE (trade name, polyethylene film manufactured by Fasson Co.; film thickness 100 μm) was used as the support instead of the soft vinyl chloride sheet. The obtained cured film was cut to a size of 5 cm in axial length×2.5 cm in width, and the cured film was stretched at a rate of 30 cm/min using a tensile testing machine (trade name: AUTOGRAPH AGS-J, manufactured by Shimadzu Corp.). Then, the ratio of elongation at which the cured film ruptured was measured. The condition in which the film was extended to a length double the initial length, was defined as 100% elongation.

An acceptable range of the ratio of elongation is 200% or more and the range is more preferably 300% or greater.

(Evaluation of Jetting Stability)

The jetting stability at the head nozzle of the ink composition (after being filtered) obtained as described above, was evaluated as follows.

That is, in a process of continuous jetting for 60 minutes by a commercially available inkjet recording apparatus having piezoelectric type inkjet nozzles under the conditions shown below, the number of nozzle losses was measured.

-Conditions-

Number of channels: 318/head

Driving frequency: 4.8 kHz/dot

Ink droplet: 7 droplets, 42 pl

Temperature: 45° C.

The experiment was carried out using a method of jetting the ink composition on a PET substrate, and then performing exposure (amount of exposure: 1,000 mW/cm$^2$). The number of nozzle losses (number of clogged nozzles) at that time was counted.

-Evaluation Criteria-

A: Number of nozzle losses being 0 or more and smaller than 5

B: Number of nozzle losses being 5 or more and smaller than 10

C: Number of nozzle losses being 10 or more.

(Evaluation of Image Smoothness)

The smoothness of image was evaluated by visual inspection. In regard to the evaluation criteria, an image giving a strong feeling of relief over the entire image was rated as C, an image that was acceptable but deteriorating was rated as B, and an image that was improving was rated as A.

The following can be seen from the Table 2. In the Examples 1 to 8 and 12 making use of radical polymerizable compositions that use D-1 to D-8 and D-12, which are the specific polymers of the invention having (A-1) a polyoxyalkylene group and (A-2) a partial structure selected from the group consisting of a fluoroalkyl group, a siloxane skeleton and a long-chain alkyl group, the ink compositions all have high sensitivity, with low exposure sensitivity and blocking sensitivity, and have excellent jetting stability as well as excellent image smoothness. On the contrary, it can be seen that the ink composition of the Comparative Example 1 that does not include the specific polymer of the invention, has low sensitivity, with high exposure sensitivity and blocking sensitivity, while the ink composition of the Comparative Example 2 is poor in the image smoothness.

Furthermore, in the Examples 9 to 11 and 13 making use of cationically polymerizable compositions that use D-9 to D-13, which are the specific polymers of the invention having (A-1) a polyoxyalkylene group and (A-2) a partial structure selected from the group consisting of a fluoroalkyl group, a siloxane skeleton and a long-chain alkyl group, the ink compositions all have high sensitivity with low blocking sensitivity, and have excellent jetting stability as well as excellent image smoothness. On the contrary, it can be seen that the ink composition of the Comparative Example 3 that does not include the specific polymer of the invention, has low sensitivity with high blocking sensitivity, while the ink composition of the Comparative Example 4 is poor in image smoothness.

According to the invention, there may be provided an ink composition which cures with high sensitivity upon irradiation with a radiation, and is capable of forming images that are excellent in blocking resistance and smoothness, while maintaining satisfactory scratch resistance and stretchability. Furthermore, since the ink composition of the invention has excellent jetting stability, the ink composition is suitable for inkjet recording. There are also provided an inkjet recording method making use of the ink composition of the invention, and a printed article which is printed using the ink composition of the invention, and has excellent images.

What is claimed is:

1. An ink composition comprising: a polymerizable compound; a polymerization initiator; and a polymer that includes a structural unit represented by the following formula (1):

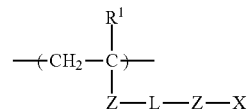

(1)

wherein, in formula (1), $R^1$ represents a hydrogen atom or a methyl group; each Z independently represents a divalent organic group; L represents a polvoxyalkylene group; and X represents a fluoroalkyl group or a siloxane skeleton.

2. The ink composition of claim 1, wherein the polymer further comprises a polymerizable functional group.

3. The ink composition of claim 1, wherein the polymerizable compound is a radical polymerizable compound.

4. The ink composition of claim 1, wherein the polymerizable compound is a cationically polymerizable compound.

5. The ink composition of claim 1, wherein the polymerizable compound comprises a monofunctional polymerizable compound, and the amount of the monofunctional polymerizable compound is in the range of 80 to 100 parts by weight, when the total amount of the polymerizable compound is taken as 100 parts by weight.

6. An inkjet recording method, the method comprising jetting the ink composition of claim 1 on a recording medium, and curing the ink composition by irradiating the jetted ink composition with active radiation.

7. A printed article printed using the ink composition of claim 1.

* * * * *